US 011338704B2

(12) United States Patent
Rdzanek

(10) Patent No.: US 11,338,704 B2
(45) Date of Patent: May 24, 2022

(54) EASY ENTRY LATCH FOR VEHICLE SEAT

(71) Applicant: Faurecia Automotive Seating, LLC, Auburn Hills, MI (US)

(72) Inventor: Emil Rdzanek, Piaseczno (PL)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 147 days.

(21) Appl. No.: 16/941,632

(22) Filed: Jul. 29, 2020

(65) Prior Publication Data
US 2022/0032822 A1 Feb. 3, 2022

(51) Int. Cl.
*B60N 2/12* (2006.01)
*B60N 2/30* (2006.01)
B60N 2/90 (2018.01)
B60N 2/10 (2006.01)

(52) U.S. Cl.
CPC .............. *B60N 2/12* (2013.01); *B60N 2/305* (2013.01); *B60N 2/3045* (2013.01); *B60N 2/10* (2013.01); *B60N 2002/948* (2018.02); *B60N 2002/952* (2018.02); *B60N 2002/971* (2018.02)

(58) Field of Classification Search
None
See application file for complete search history.

(56) References Cited

U.S. PATENT DOCUMENTS

| | | | |
|---|---|---|---|
| 4,106,809 A * | 8/1978 | Minka .................. | B60N 2/3015 297/63 |
| 5,626,391 A * | 5/1997 | Miller .................... | B60N 2/206 296/65.09 |
| 5,743,596 A * | 4/1998 | Chabanne .......... | B60N 2/01583 297/335 |
| 6,196,613 B1 * | 3/2001 | Arai ....................... | B60N 2/366 296/65.09 |
| 6,520,581 B1 * | 2/2003 | Tame ..................... | B60N 2/305 297/378.12 |
| 7,156,460 B2 * | 1/2007 | Jeong ................... | B60N 2/3011 297/331 |
| 8,840,187 B2 * | 9/2014 | Seibold .................. | B60N 2/206 297/336 |
| 10,308,146 B1 | 6/2019 | Kish | |
| 2003/0085602 A1 * | 5/2003 | Ogino .................. | B60N 2/3045 297/331 |
| 2006/0012231 A1 * | 1/2006 | Hur ..................... | B60N 2/01583 297/331 |
| 2009/0230744 A1 * | 9/2009 | Szybisty .............. | B60N 2/3065 297/335 |
| 2015/0375637 A1 * | 12/2015 | Kikuchi ................. | B60N 2/682 297/316 |
| 2017/0080831 A1 * | 3/2017 | Kaemmerer ........... | B60N 2/206 |
| 2020/0406788 A1 * | 12/2020 | Line ........................ | B60N 2/06 |

FOREIGN PATENT DOCUMENTS

CN 110525283 A 12/2019
FR 2811273 A1 * 1/2002 ......... B60N 2/01583

* cited by examiner

*Primary Examiner* — David E Allred
(74) *Attorney, Agent, or Firm* — Barnes & Thornburg LLP

(57) ABSTRACT

An occupant support includes a vehicle seat mounted to a foundation frame for sliding the vehicle seat longitudinally in a vehicle. The vehicle seat is movable from a slid-back configuration to a forward-seating configuration and may be changed from a horizontal-use configuration to a tilted configuration for easy entry into or exit from a rear row of the vehicle. The vehicle seat may be locked in the tilted configuration.

18 Claims, 15 Drawing Sheets

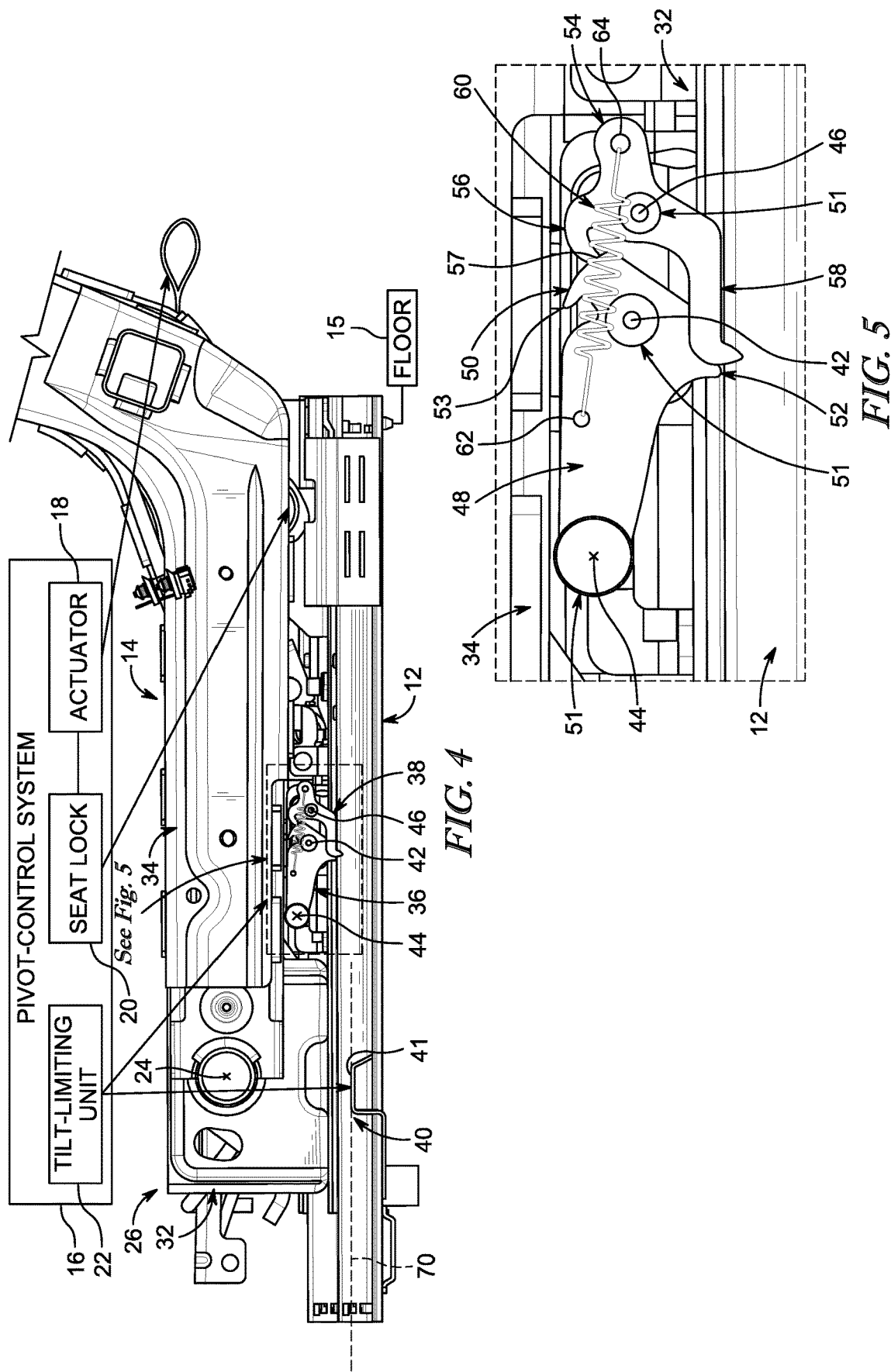

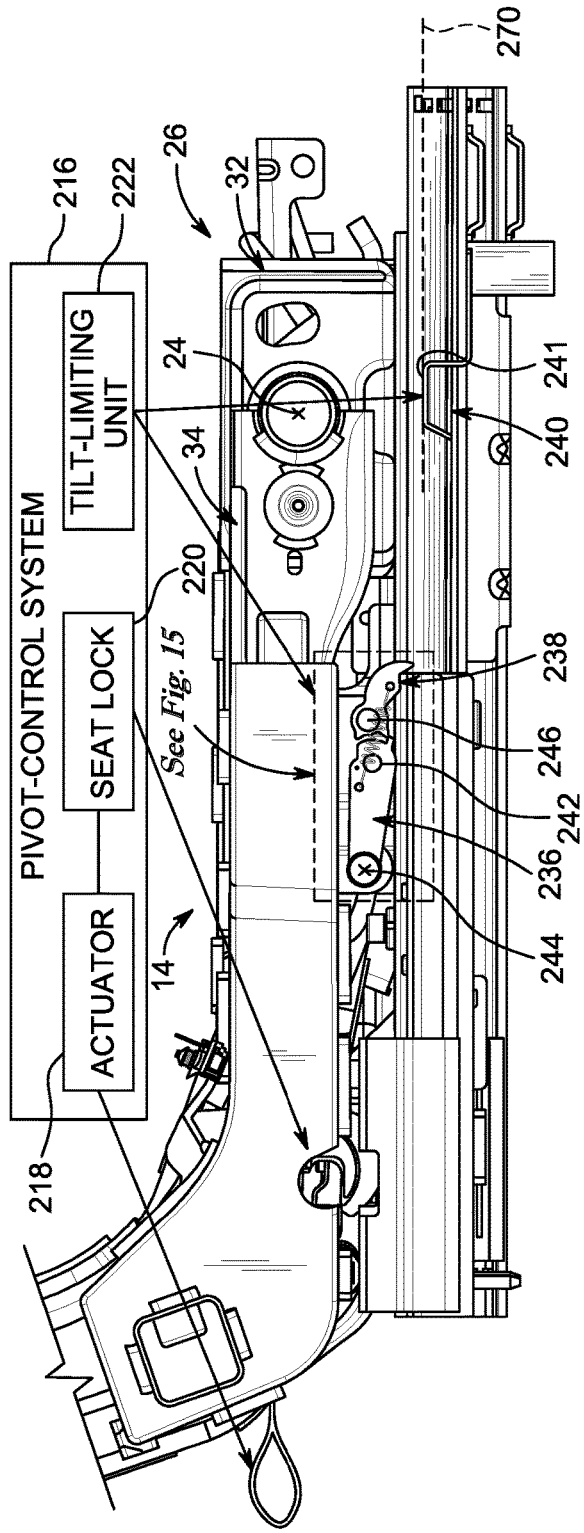
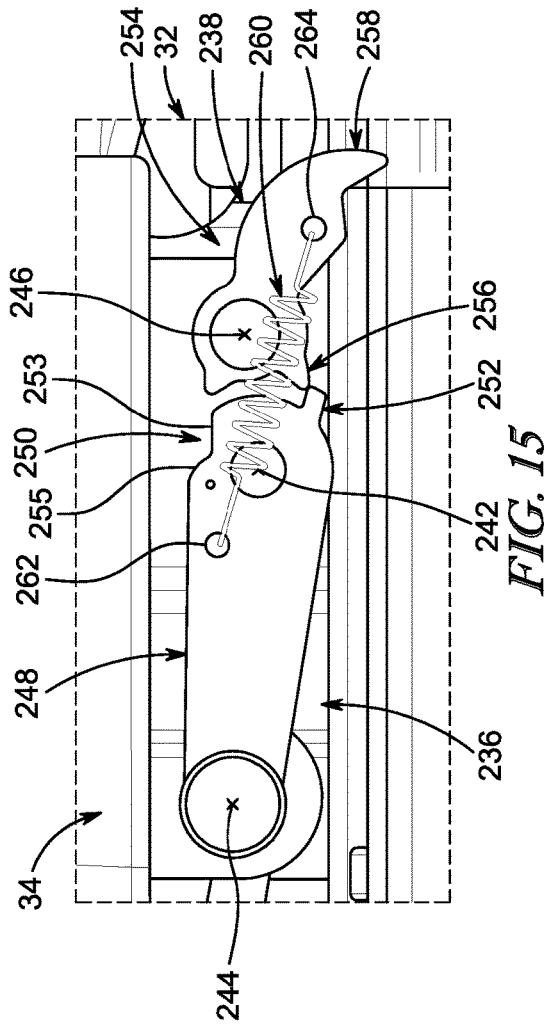
FIG. 14
FIG. 15

US 11,338,704 B2

EASY ENTRY LATCH FOR VEHICLE SEAT

BACKGROUND

The present disclosure relates to vehicle seats, and particularly to movable vehicle seats. More particularly, the present disclosure relates to motion-control mechanisms included in movable vehicle seats.

SUMMARY

According to the present disclosure, an occupant support for a vehicle includes a foundation frame configured to be coupled to a floor of the vehicle and a vehicle seat that is mounted to the foundation frame. The vehicle seat is mounted to the foundation frame for sliding movement relative to the foundation frame between a slid-back configuration and a forward-seating configuration when the vehicle seat is being used by an occupant seated thereon in a horizontal-use configuration. The vehicle seat is configured to move from the horizontal-use configuration to a tilted configuration in which at least a portion of the vehicle seat is tilted relative to the foundation frame. The vehicle seat may be moved to a slid-forward configuration for easy entry into or exit from a rear row of the vehicle behind the occupant support.

In illustrative embodiments, the occupant support further includes a tilt-limiting unit that is configured to control the position of the vehicle seat relative to the foundation frame when switching between the horizontal-use configuration and the tilted configuration. The tilt-limiting unit is configured to lock the vehicle seat in the tilted configuration when the vehicle seat is in the forward-seating configuration. The tilt-limiting unit blocks the vehicle seat from returning to the horizontal-use configuration until the tilt-limiting unit is disengaged by moving the vehicle seat toward the slid-back configuration.

In illustrative embodiments, the tilt-limiting unit includes a first lever configured to move with the vehicle seat, a second lever fixed in position relative to the foundation frame, and a stationary stop mounted to the foundation frame. The second lever is configured to change from a freed position, when the vehicle seat is in the horizontal-use configuration, to a locked position, when the vehicle seat is in the tilted configuration. In the freed position, the second lever is positioned entirely above an upper limit of the stationary stop so that the vehicle seat can slide forward and aft unobstructed. The second lever is biased to rotate to the locked position as the vehicle seat changes to the tilted configuration such that a portion of the second lever extends below the upper limit of the stationary stop and another portion of the second lever is engages the first lever to block the vehicle seat from returning to the horizontal-use configuration.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 4 is an enlarged side view of an outboard side of the occupant support with portions removed showing the vehicle seat arranged in the slid-back configuration and in the horizontal-use configuration and showing that the tilt-limiting unit includes a first lever, a second lever biased into engagement with the first lever and a stationary stop coupled to the foundation frame;

FIG. 5 is an enlarged view of a portion of FIG. 4 showing the first lever and the second lever being biased together by a helical tension spring;

FIG. 14 is an enlarged side view of an inboard side of the occupant support with portions removed showing the vehicle seat arranged in the slid-back configuration and in the horizontal-use configuration and showing another embodiment of a tilt-limiting unit that includes a first lever, a second lever biased into engagement with the first lever, and a stationary stop coupled to the foundation frame;

FIG. 15 is an enlarged view of a portion of FIG. 14 showing the first lever and the second lever being biased together by a helical tension spring;

DETAILED DESCRIPTION

Figure 1:
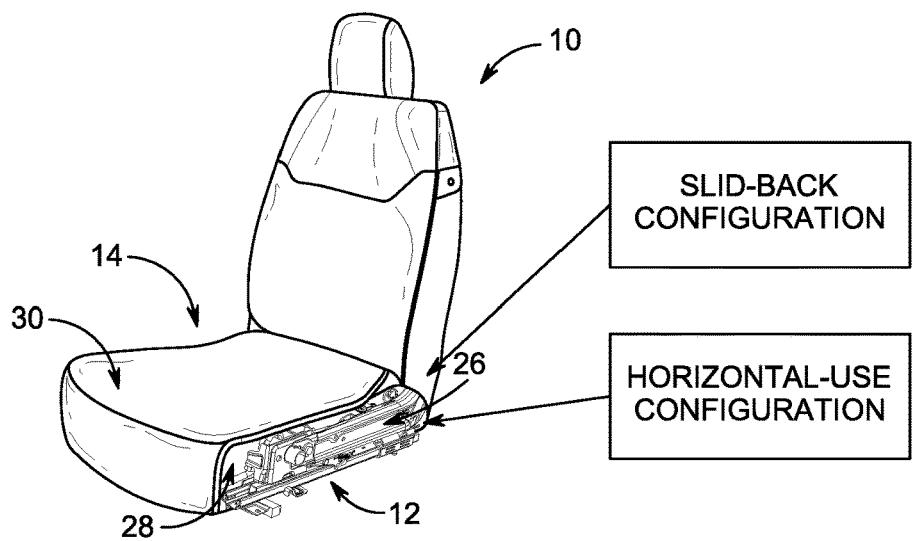
FIG. 1 is a perspective and diagrammatic view of an occupant support including a seat foundation mounted to a floor of a vehicle and a vehicle seat coupled to the seat foundation for sliding movement relative to the seat foundation between a slid-back configuration, as show in FIG. 1, a forward-seating configuration, as shown in FIG. 2, and a slid-forward configuration when the vehicle seat is tiled upwardly to a tilted configuration for easy entry into a rear row of a vehicle, as shown in FIG. 3.
Figure 2:
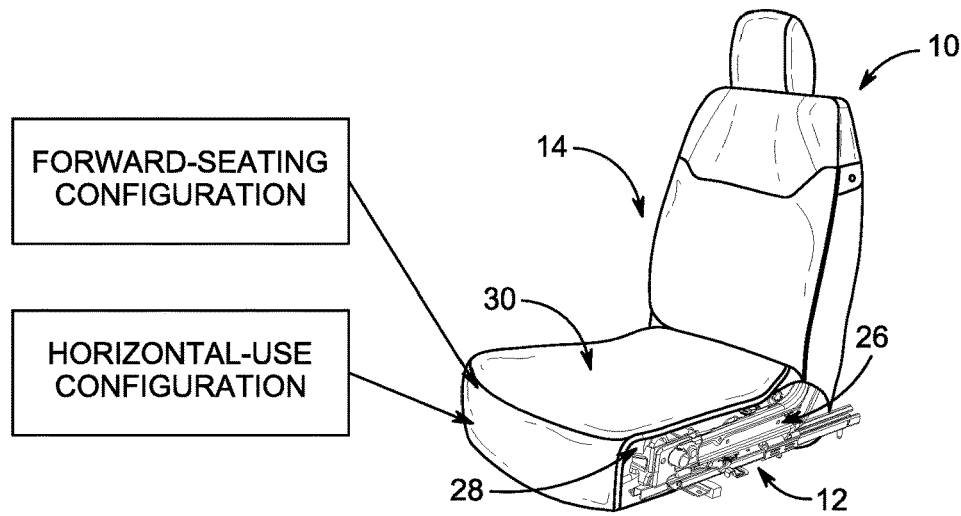
FIG. 2 is a perspective and diagrammatic view similar to FIG. 1 showing the vehicle seat moved to the forward-seating configuration and arranged in a horizontal-use configuration where the vehicle seat is arranged relative to the seat foundation to support an occupant thereon.

An illustrative passenger support 10, in accordance with the present disclosure, is shown in FIG. 1 and is configured to mount to a floor 15 of a vehicle. The occupant support 10 includes a foundation frame 12 coupled to the floor 15 of the vehicle and a vehicle seat 14 mounted on the foundation frame 12. The foundation frame 12 is configured to support the vehicle seat 14 above the floor 15 between a front-row passenger support and a back-row passenger support, for example. Vehicle seat 14 is slidable relative to the foundation frame 12 from a slid-back configuration, shown in FIG. 1, to a forward-seating configuration, as shown in FIG. 2. The vehicle seat 14 is configured to support an occupant at any position between the slid-back configuration and the forward-seating configuration to fit occupants of different sizes. In the forward-seating configuration, the vehicle seat 14 may be moved to a tilted configuration and slid farther forward relative to the foundation frame 12 to a slid-forward configuration, as shown in FIG. 3, for easy entry into a back-row of the vehicle.

Figure 3:
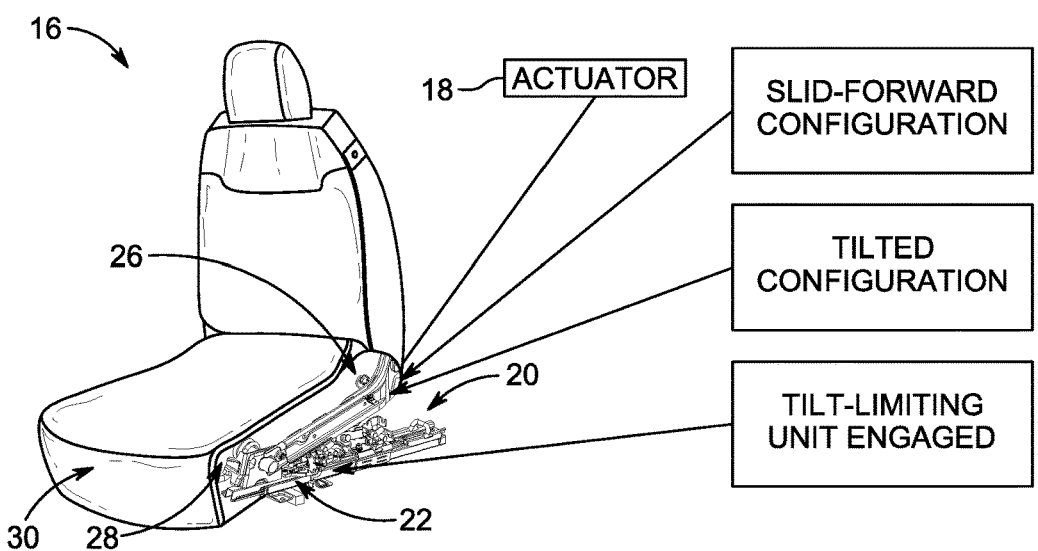
FIG. 3 is a perspective and diagrammatic view showing the vehicle seat moved from the horizontal-use configuration to the tilted configuration and showing that the occupant support further includes a tilt-limiting unit that engages when the vehicle seat is moved to the tilted configuration to lock the vehicle seat in the tilted configuration until the vehicle seat is moved from the slid-forward configuration toward the slid-back configuration.
Figure 7:
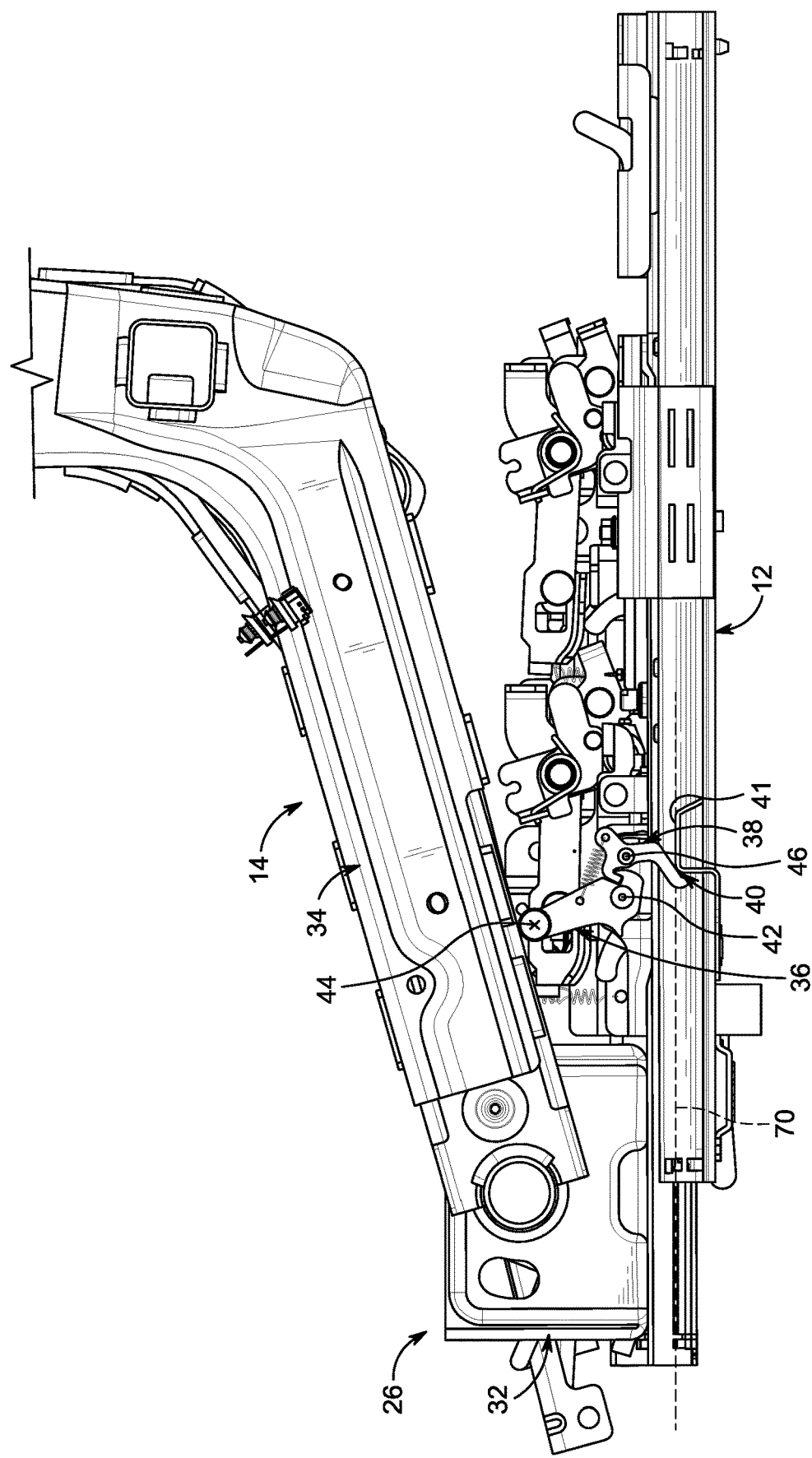
FIG. 7 is a side view of the occupant support with portions removed showing the vehicle seat arranged in the slid-forward configuration and the tilted configuration and showing the tilt-limiting unit in a locked position to block the vehicle seat from returning to the horizontal-use configuration and showing the second lever extending below the upper limit of the stop so that, when the vehicle seat is moved from the slid-forward configuration toward the slid-back configuration, the second lever will engage the stop, as shown in FIG. 8, to free the second lever from the first lever and so that the vehicle seat can be pivoted downwardly to return to the horizontal-use configuration.
Figure 12:
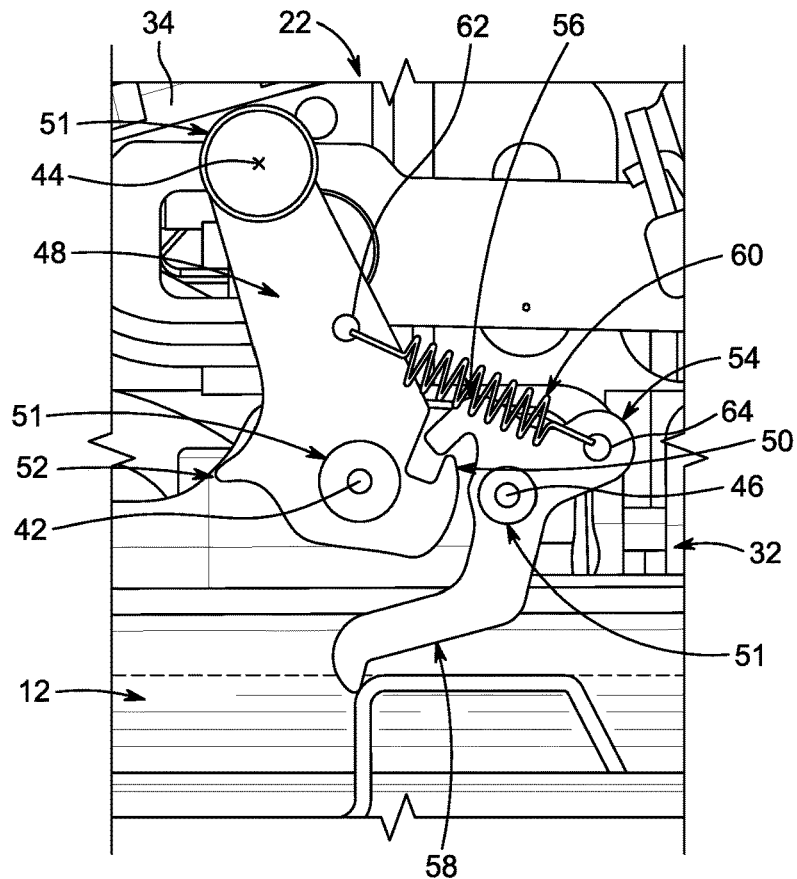
FIG. 12 is an enlarged portion of FIG. 9 showing the second lever contacting the stop to pivot the second lever out of engagement with the first lever so that the vehicle seat is free to move from the tilted configuration to the horizontal-use configuration.

The occupant support 10 further includes a pivot-control system 16 that controls movement of the vehicle seat 14 between the horizontal-use configuration and the tilted configuration as suggested in FIGS. 1-3. The pivot-control system 16 includes an actuator 18, a seat lock 20 coupled to the actuator 18, and a tilt-limiting unit 22 configured to lock the vehicle seat 14 in the tilted configuration as shown in FIG. 3. The actuator 18 may be a handle, strap, lever, or another suitable structure that can be actuated by a user to change the vehicle seat 14 from the horizontal-use configuration to the tilted configuration. The seat lock 20 is configured to retain the vehicle seat 14 in the horizontal-use configuration until the vehicle seat 14 is moved to the forward seating configuration and the actuator 18 is moved by the user to disengage the seat lock 20 so that the vehicle seat 14 can pivot about a forward pivot axis 24 from the horizontal-use configuration to the tilted configuration. The tilt-limiting unit 22 is configured to stop pivoting of the vehicle seat 14 about the forward pivot axis 24 at a predetermined orientation relative to the foundation frame 12 to arrange the vehicle seat in the tilted configuration as shown in FIGS. 3, 7, and 12. The tilt-limiting unit 22 also blocks the vehicle seat 14 from returning to the horizontal-use configuration until the vehicle seat 14 is moved toward the slid-back configuration to cause the tilt-limiting unit 22 to disengage while simultaneously urging the vehicle seat 14 toward the horizontal-use configuration as suggested in FIGS. 9 and 13. The predetermined orientation may be adjusted depending on the shape or size of the vehicle seat 14 or the location of the vehicle seat 14 relative to other components within the vehicle.

The vehicle seat 14 includes seat frame 26, foam pads 28 coupled to the seat frame 26, and an outer trim 30 covering the seat frame 26 and the foam pads 28 as shown in FIGS. 1-3. The seat frame 26, the foam pads 28, and the outer trim 30 are each movable relative to the foundation frame 12 so that vehicle seat 14 can be reconfigured to the tilted configuration for easy entry into a rear row behind occupant support 10 as shown in FIG. 3. The seat frame 26 is mounted to the foundation frame 12 for sliding movement relative to the foundation frame 12 between the slid-back configuration and the slid-forward configuration. The foam pads 28 are formed around all or portions of the seat frame 26 to provide cushioning for occupants seated on the occupant support 10. The outer trim 30 covers the foam pads 28 and the seat frame 26 and may be a cloth, leather material, combinations thereof, or any other suitable material.

The pivot-control system 16 is coupled to the seat frame 26 to support rigidly the vehicle seat 14 on the foundation frame 12 when the vehicle seat is in the horizontal-use configuration and the tilted configuration as shown in FIGS. 1-3. The seat frame 26 includes a slidable, stationary frame 32 and a pivotable frame 34 as shown in FIGS. 4 and 5. The stationary frame 32 is mounted to the foundation frame 12 for back-and-forth sliding movement on the foundation frame 12. The pivotable frame 34 is coupled to the stationary frame 32 for sliding movement with the stationary frame 32 relative to the foundation frame 12 and is configured to pivot about pivot axis 24 to change the vehicle seat 14 from the horizontal-use configuration to the tilted configuration. The seat lock 20 is configured to retain a rear end of the pivotable frame 34 to the stationary frame 32 or the foundation frame 12 until the actuator 18 is moved by a user to disengage the rear end of the pivotable frame 34 so that the vehicle seat 14 can move to the tilted configuration. The tilt-limiting unit 22 engages when the vehicle seat 14 is moved to the tilted configuration to retain the pivotable frame 34 at an angle relative to the stationary frame 32 until the vehicle seat 14 is slid rearward toward the slid-back configuration.

The tilt-limiting unit 22 includes a first lever 36 that interconnects the stationary frame 32 and the pivotable frame 34, a second lever 38 coupled to the stationary frame 34, and a stationary stop 40 coupled to the foundation frame 12 as shown in FIGS. 4 and 5. The first lever 36 is mounted to the stationary frame 32 for pivotable movement about a first pivot axis 42 and is mounted to the pivotable frame 34 for pivotable movement about a second pivot axis 44. The second lever 38 is mounted to the stationary frame 32 for pivotable movement about a third pivot axis 46 that is spaced apart from the first pivot axis 42. The second lever 38 is biased into contact with the first lever 36 when the vehicle seat 14 is in both the horizontal-use configuration and the tilted configuration. The stationary stop 40 is aligned laterally with the second lever 38 relative to the foundation frame 12 and is configured to interact with the second lever 38 to change the vehicle seat 14 from the tilted configuration to the horizontal-use configuration.

The first lever 36 is configured to retain the pivotable frame 34 at a predetermined angle relative to the stationary frame 32 to block further rotation of the vehicle seat 14 past the tilted configuration. The first lever 36 includes a first lever body 48, a first retainer 50, and a rotation stopper 52 as shown in FIG. 5. The first lever 36 is a flat plate of rigid material that is capable of retaining the pivotable frame 34 in the tilted configuration. The lever body 50 houses a pair of bearings and/or bushings 51 that provide the first pivot axis 42 and the second pivot axis 44 and allow the first lever 36 to pivot relative to both the stationary frame 32 and the pivotable frame 34 when the vehicle seat 14 changes between the horizontal-use configuration and the tilted configuration. The retainer 50 is configured to engage the second lever 38 when the vehicle seat 14 is in the tilted configuration to block the vehicle seat from returning to the horizontal-use configuration until the vehicle seat 14 is moved toward the slid-back configuration as will be described. In illustrative embodiments, the retainer 50 forms a hook, however, the retainer may be shaped differently in some embodiments. The rotation blocker 52 is configured to engage the second lever 38 when the vehicle seat 14 is in the horizontal-use configuration to block further rotation of the first lever 36 and the second lever 38 about their respective axes 42, 44, 46. The rotation blocker 52 is located on an opposite side of the lever body 48 from the retainer 50 relative to the first pivot axis 42.

Figure 11:
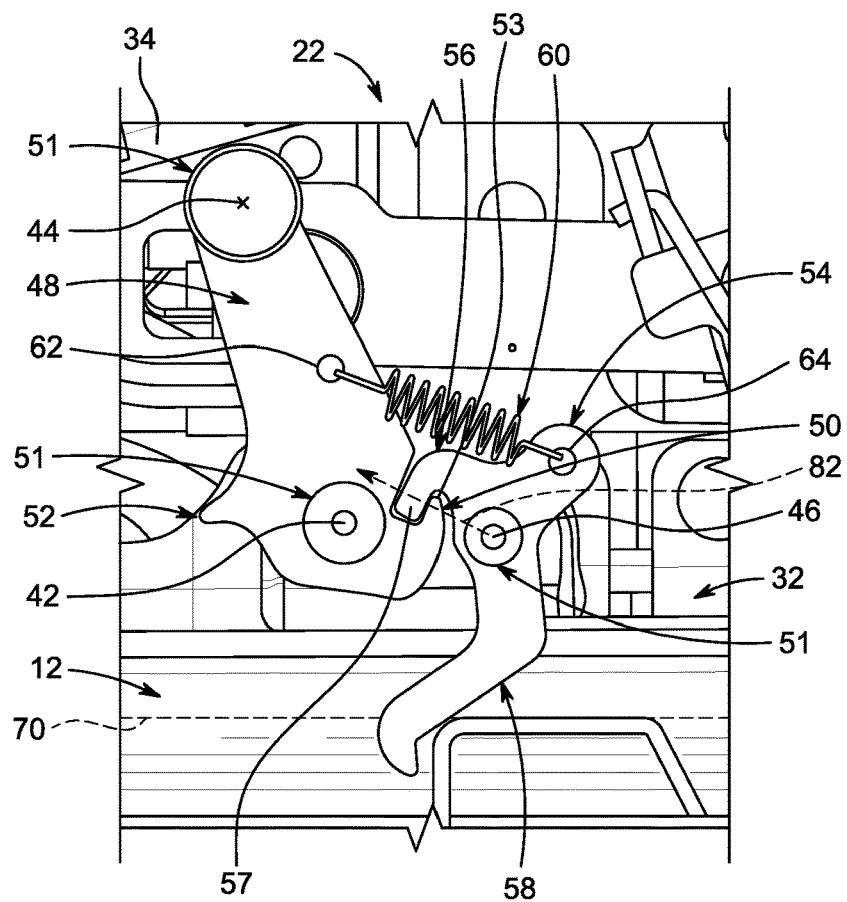
FIG. 11 is an enlarged portion of FIG. 7 showing the vehicle seat arranged in the tilted configuration and the second lever of the tilt-limiting unit arranged to extend below the upper limit of the stop so that the second lever engages the stop when the vehicle seat is moved from the slid-forward configuration toward the slid-back configuration.

The second lever 38 cooperates with the first lever 36 to block the vehicle seat from pivoting downwardly to the horizontal-use configuration and cooperates with the stationary stop 40 to disengage the tilt-limiting unit 22. The second lever 38 includes a second lever body 54, a second retainer 56, and a lever arm 58 as shown in FIG. 5. The lever body 54 houses a bearing and/or bushing 51 that provides the third pivot axis 46 and allows the second lever 38 to pivot relative to the stationary frame 32 when the vehicle seat 14 changes between the horizontal-use configuration and the tilted configuration. The retainer 56 is configured to interlock with the first retainer 50 when the vehicle seat 14 is in the tilted configuration to block the vehicle seat 14 from tilting downwardly back to the horizontal-use configuration as shown in FIGS. 7 and 11. In illustrative embodiments, the second retainer 56 forms a hook that complements the first retainer 50, however, the retainer 56 may be shaped differently in some embodiments. The lever arm 58 cooperates with the stationary stop 40 to disengage the first retainer 50 and the second retainer 56 so that the vehicle seat 14 can be tilted downwardly back to the horizontal-use configuration.

The first lever 36 and the second lever 38 are also coupled to one another by a biasing spring 60 as shown in FIG. 5. The biasing spring 60 is coupled to the lever body 48 of the first lever 36 using a first aperture 62 and is coupled to the lever body 54 of the second lever 38 using a second aperture 64. The biasing spring 60 extends along a line between the first aperture 62 and the second aperture 64 that is arranged to lie above the first pivot axis 42 and the third pivot axis 46. The biasing spring 60 is arranged relative to the third pivot axis 46 to urge the second lever 38 to rotate about the third pivot axis 46 in a direction that moves the second retainer 56 toward the first retainer 50. The biasing spring 60 causes the second lever 38 to rotate in a direction that is opposite to a direction of rotation of the first lever 36 when the vehicle seat 14 is changing from the horizontal-use configuration to the tilted configuration. The lever arm 58 is located on an opposite end of the second lever 38 from the retainer 56 relative to the third pivot axis 46 such that the lever arm 58 and the retainer 56 move in opposite forward and aft directions from one another as the second lever 38 pivots about the third pivot axis 46 when the vehicle seat 14 changes from the horizontal-use configuration to the tilted configuration.

In illustrative embodiments, the biasing spring 60 is a helical tension spring that applies a tension force between the first and second apertures 62, 64 to pull the second lever 38 to rotate in a counterclockwise direction about the third pivot axis when viewed in the direction shown in FIGS. 4-13. In some embodiments, the second lever 38 may be biased to rotate about the third pivot axis 46 by another type of spring such as a torsion spring, a helical compression spring, a leaf spring, a plate spring, or any other suitable type of spring.

Figure 6:
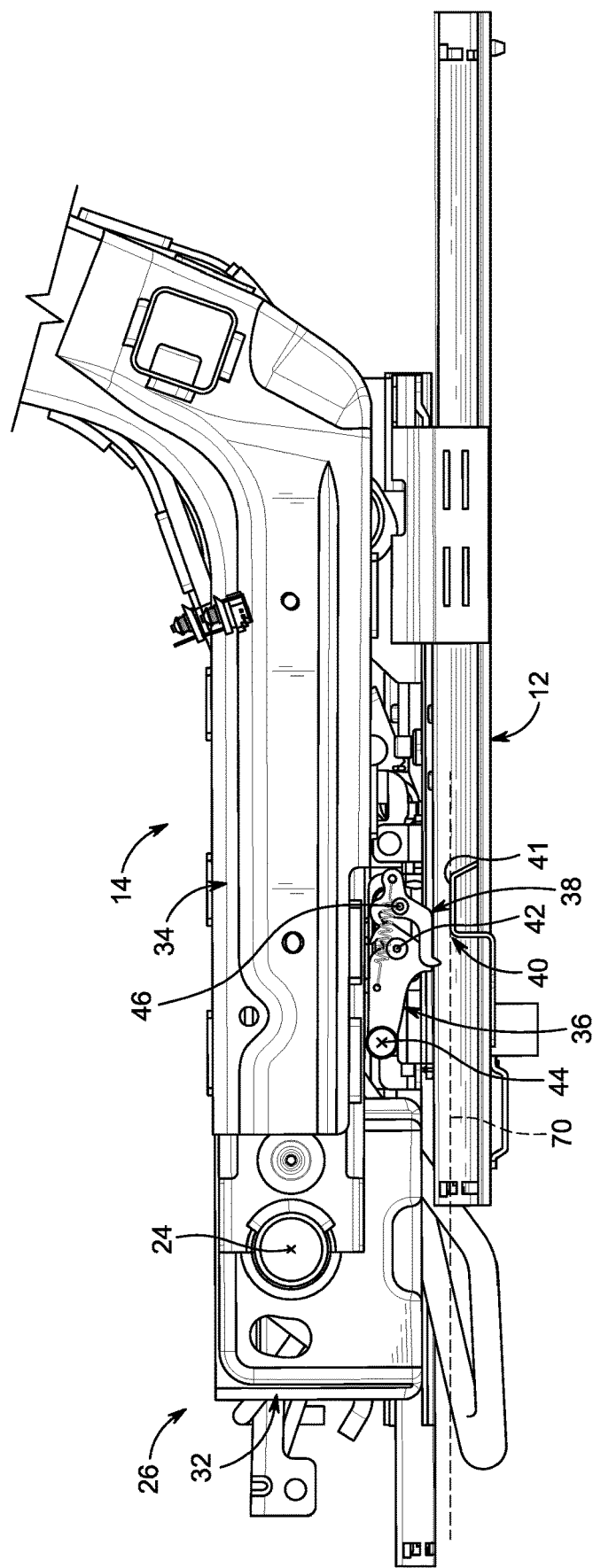
FIG. 6 is a side view of the occupant support with portions removed showing the vehicle seat arranged in the forward-seating configuration and in the horizontal-use configuration and showing the first lever positioned above an upper limit of the stationary stop so that the vehicle seat can move from the slid-back configuration to the slid-forward configuration.
Figure 8:
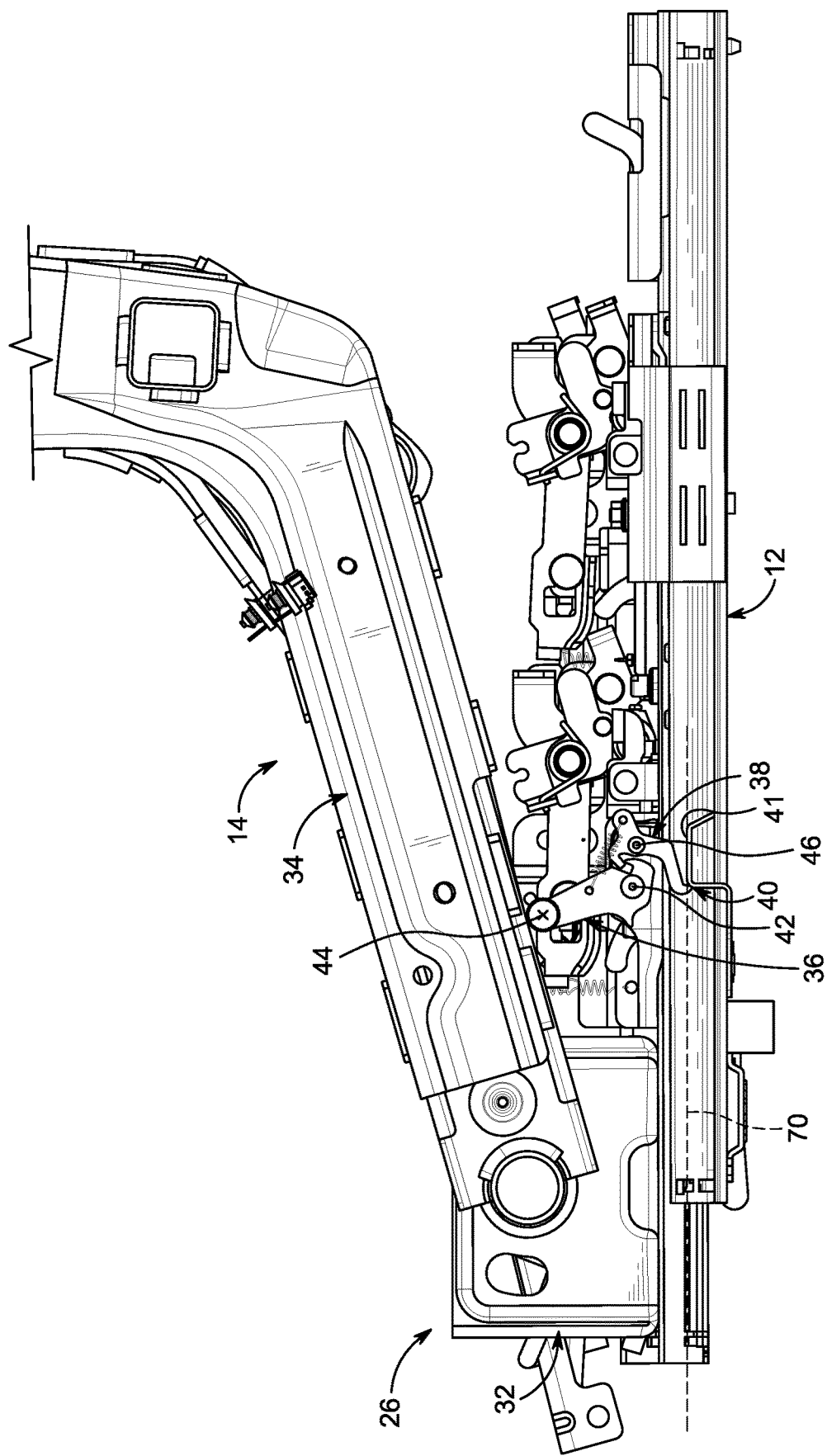
FIG. 8 is a side view of the occupant support with portions removed showing the vehicle seat arranged in the tilted configuration and moved from the slid-forward configuration toward the slid-back configuration and showing the second lever contacting the stop to disengage the tilt-limiting unit.
Figure 9:
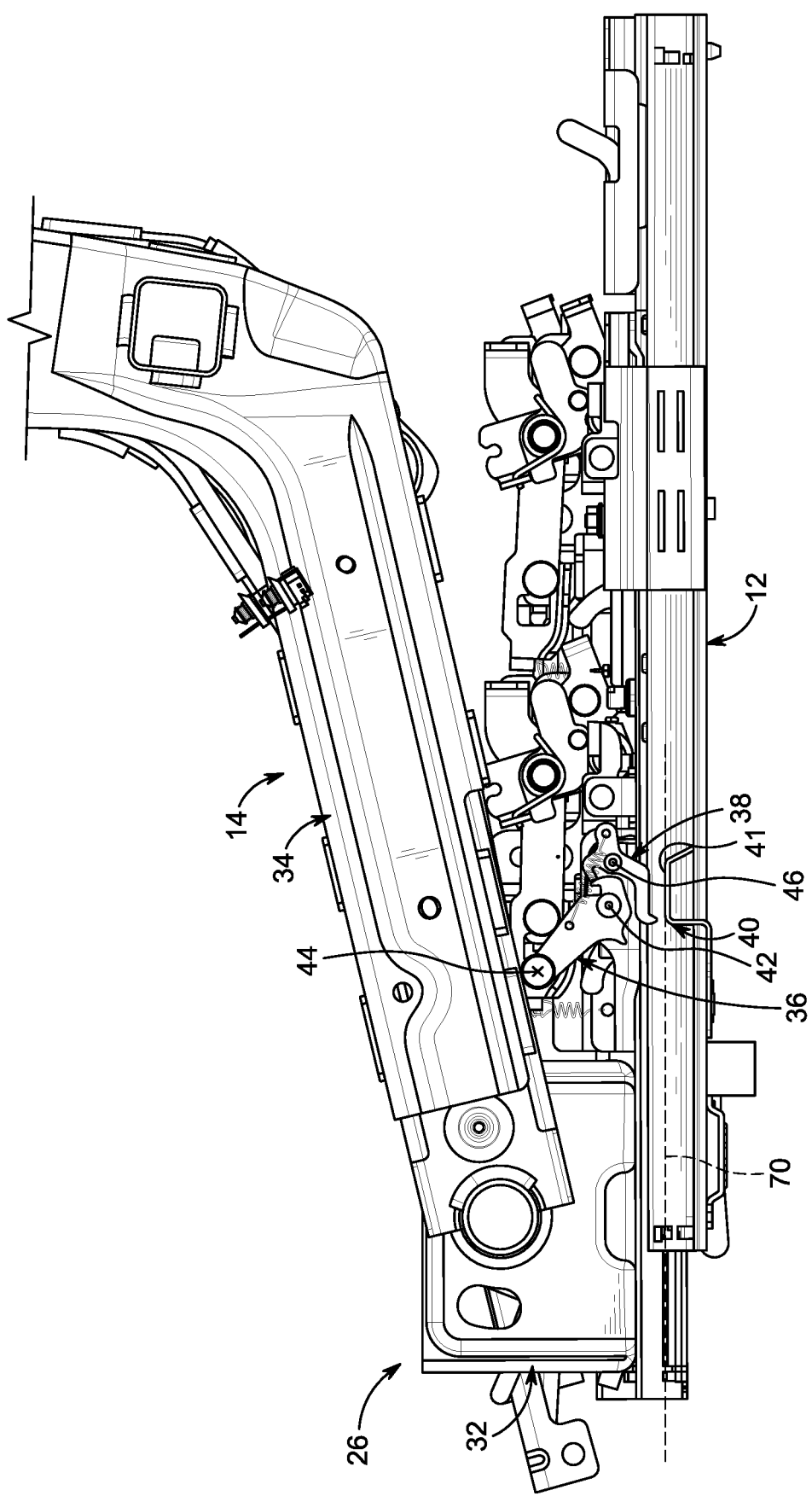
FIG. 9 is a side view of the occupant support with portions removed showing the vehicle seat moved further toward the slid-back configuration and showing the second lever freed from the first lever so that the vehicle seat can return to the horizontal-use configuration.
Figure 10:
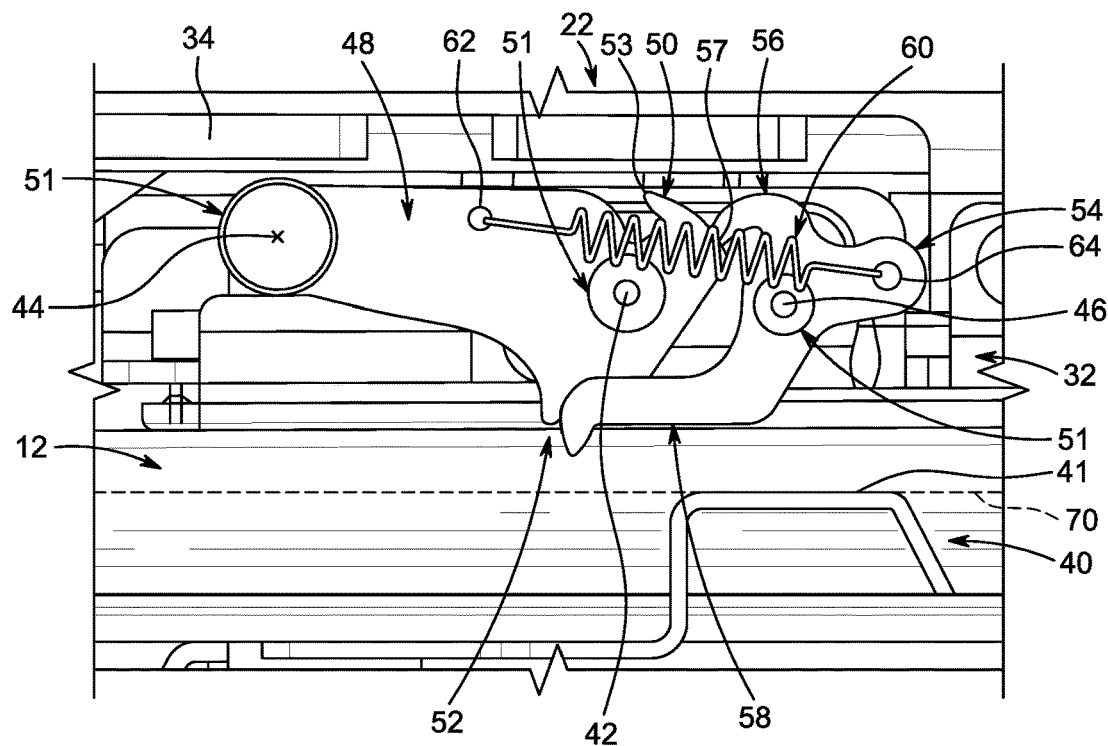
FIG. 10 is an enlarged portion of FIG. 6 showing the vehicle seat in the horizontal-use configuration and the second lever of the tilt-limiting unit positioned above the upper limit of the stop so that the vehicle seat is free to move between the slid-back configuration and the slid-forward configuration.

The stationary stop 40 is a rigid component having an upper surface 41 that is arranged to extend along a horizontal limit plane 70 as shown in FIGS. 5-8. The upper surface 41 provides an upper limit of the stop 40 relative to the second lever 38. The second lever 38 is located entirely above the horizontal limit plane 70 when the vehicle seat 14 is in the horizontal-use configuration as shown in FIGS. 5 and 6. The second lever 38 is biased such that a portion of the second lever 38 extends below the horizontal limit plane 70 when the vehicle seat 14 is in the tilted configuration as shown in FIGS. 7 and 8. The second lever 38 is configured to engage the stationary stop 40 as the vehicle seat 14 is moved from the slid-forward configuration toward the slid-back configuration to cause the vehicle seat to return to the horizontal-use configuration as shown in FIGS. 9 and 10. The tilt-limiting unit 22 and portions of the vehicle seat 14 and foundation frame 12 are enlarged in FIGS. 10-13 to further illustrate the movements of each component relative to one another as the vehicle seat 14 changes between the horizontal-use configuration and the tilted configuration.

The vehicle seat 14 is configured to move from the slid-back configuration, as shown in FIGS. 4 and 5, toward the slid-forward configuration, as shown in FIG. 6. The lever arm 58 of the second lever 38 is positioned aft of the stationary stop 40 when the vehicle seat 14 is in the slid-back configuration as shown in FIG. 4. The lever arm 58 is positioned forward of the stationary stop 40 when the vehicle seat 14 is in the forward-seating configuration and the slid-forward configuration as shown in FIGS. 6 and 7. In the forward-seating configuration, the actuator 18 may be engaged by a user to release the seat lock 20 so that the pivotable frame 34 may pivot about the frame pivot axis 24 from the horizontal-use configuration, as shown in FIG. 6, to the tilted configuration, as shown in FIG. 7. In some embodiments, the seat lock 20 is blocked from being released until the vehicle seat 14 is in the forward-seating configuration to ensure that the lever arm 54 is positioned forward of the stationary stop 40 before the vehicle seat 14 is moved to the tilted configuration.

The second lever 38 is configured to move relative to the first lever 36 between a freed position and a locked position when the vehicle seat 14 changes from the horizontal-use configuration to the tilted configuration as shown in FIGS. 6, 7, 11, and 12. In the freed position, the retainer 56 of the second lever 38 is biased into contact with a side edge of the retainer 50 of the first lever 36 by the spring 60. When the vehicle seat 14 is moved to the tilted configuration, the retainer 50 of the first lever 36 is rotated downwardly until a tip 57 of retainer 56 of second lever 38 slides over a tip 53 of retainer 50 of first lever 36 as shown in FIGS. 7, 8, and 12. The spring 60 biases the tip 57 of retainer 56 of second lever 38 to move downwardly to interlock with retainer 50 in the locked position. At the same time, rotation of the second lever 38 by spring 60 causes lever arm 58 to move downwardly and to extend below horizontal reference plane 70.

In the locked position, the retainers 50, 56 cooperate to block the pivotable frame 34 from tilting downwardly toward the foundation frame 12 due to their orientation relative to one another. The retainer 50 of the first lever 36 and the retainer 56 of the second lever 38 are oriented relative to one another so that a force vector 82 extends along a line through third pivot axis 46 and each retainer 50, 56 toward frame pivot axis 24 as suggested in FIG. 11. Force vector 82 is formed as a result of a tensile load being applied by the retainer 50 of the first lever 36 on the retainer 56 of the second lever 38. This blocks the first lever 36 from rotating in a counterclockwise direction about first pivot axis 42 until the retainer 56 of the second lever 38 is freed from the retainer 50 of the first lever 36. In some embodiments, the force vector 82 extends through frame pivot axis 24.

Figure 13:
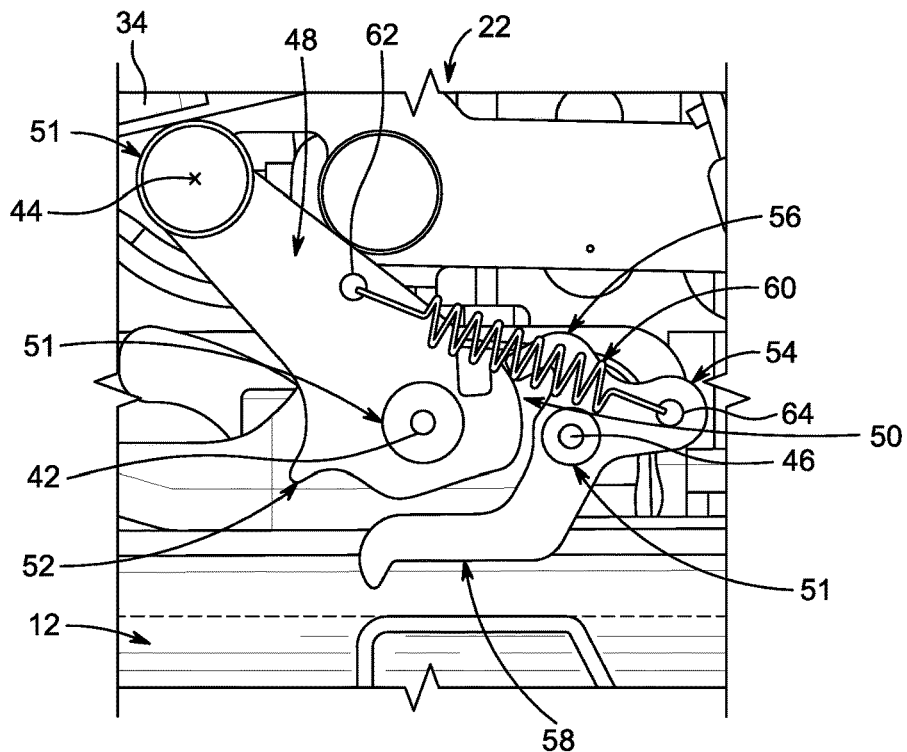
FIG. 13 is an enlarged portion of FIG. 10 showing the vehicle seat returning to the horizontal-use configuration and the second lever returned to a position above the upper limit of the stop.

To change the vehicle seat 14 from the tilted configuration to the horizontal use configuration, the vehicle seat 14 is moved from the slid-forward configuration toward the slid-back configuration as shown in FIGS. 7-9 and 11-13. The lever arm 58 is configured to engage the stationary stop 40 as the vehicle seat is moved from the slid-forward configuration toward the slid-back configuration because it is biased to extend below horizontal reference plane 70 as shown in FIGS. 8 and 11. The stationary stop 40 causes the second lever 38 to rotate from the locked position to the freed position where the retainer 56 of the second lever 38 is disengaged from retainer 50 of the first lever as shown in FIGS. 9, 12, and 13.

Another embodiment of a tilt-limiting unit 222 that can be used with foundation frame 12, vehicle seat 14, and pivot-control system 16 is shown in FIGS. 14-23. Tilt limiting unit 222 is similar to tilt-limiting unit 22 and similar reference numbers in the 200 series are used to describe similar features that are common between tilt-limiting unit 22 and tilt-limiting unit 222. Accordingly, the disclosure of tilt-limiting unit 22 is hereby incorporated by reference herein for tilt-limiting unit 222 except for the differences described below and shown in FIGS. 14-23.

The tilt-limiting unit 22 includes a first lever 236 that interconnects the stationary frame 32 and the pivotable frame 34, a second lever 238 coupled to the stationary frame 34, and a stationary stop 240 coupled to the foundation frame 12 as shown in FIGS. 14 and 15. The first lever 236 is mounted to the stationary frame 32 for pivotable movement about a first pivot axis 242 and is mounted to the pivotable frame 34 for pivotable movement about a second pivot axis 244. The second lever 238 is mounted to the stationary frame 32 for pivotable movement about a third pivot axis 246 that is spaced apart from the first pivot axis 242. The second lever 238 is biased into contact with the first lever 236 when the vehicle seat 14 is in both the horizontal-use configuration and the tilted configuration. The stationary stop 240 is aligned laterally with the second lever 238 relative to the foundation frame 212 and is configured to interact with the second lever 238 to change the vehicle seat 14 from the tilted configuration to the horizontal-use configuration.

The first lever 236 is configured to retain the pivotable frame 34 at a predetermined angle relative to the stationary frame 32 to block further rotation of the vehicle seat 14 past the tilted configuration. The first lever 236 includes a first lever body 248, a first retainer 250, and a rotation stopper 252 as shown in FIG. 15. The first lever 236 is a flat plate of rigid material that is capable of retaining the pivotable frame 34 in the tilted configuration. The lever body 250 houses a pair of bearings and/or bushings 251 that provide the first pivot axis 242 and the second pivot axis 244 and allow the first lever 236 to pivot relative to both the stationary frame 32 and the pivotable frame 34 when the vehicle seat 14 changes between the horizontal-use configuration and the tilted configuration. The retainer 250 is configured to engage the second lever 238 when the vehicle seat 14 is in the tilted configuration to block the vehicle seat from returning to the horizontal-use configuration until the vehicle seat 14 is moved toward the slid-back configuration as will be described. In illustrative embodiments, the retainer 250 is provided by an indentation in lever body 48 defined by a flat engagement surface 253 and a rotation-blocking surface 253, however, other the retainer may be shaped differently in some embodiments. The rotation blocker 252 is configured to engage the second lever 238 when the vehicle seat 14 is in the horizontal-use configuration to block further rotation of the second lever 238 about third pivot axis 246. The rotation blocker 252 is located on an opposite side of the lever body 248 from the retainer 250 relative to the first pivot axis 242.

Figure 17:
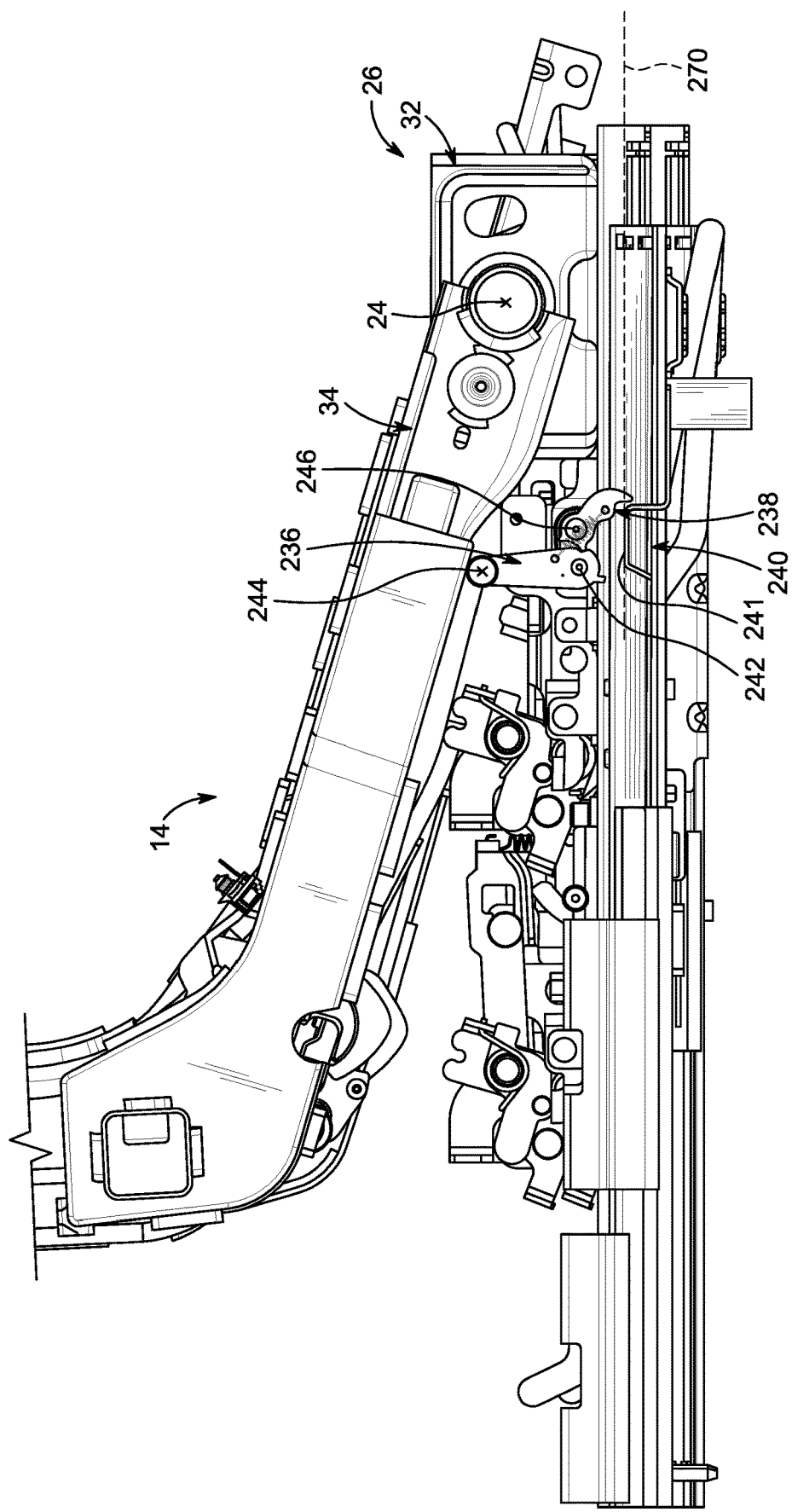
FIG. 17 is a side view of the occupant support with portions removed showing the vehicle seat arranged in the slid-forward configuration and the tilted configuration and showing the tilt-limiting unit in a locked position to block the vehicle seat from returning to the horizontal-use configuration and showing the second lever extending below the upper limit of the stop so that, when the vehicle seat is moved from the slid-forward configuration toward the slid-back configuration, the second lever will engage the stop, as shown in FIG. 18, to free the second lever from the first lever and so that the vehicle seat can be pivoted downwardly to return to the horizontal-use configuration.
Figure 21:
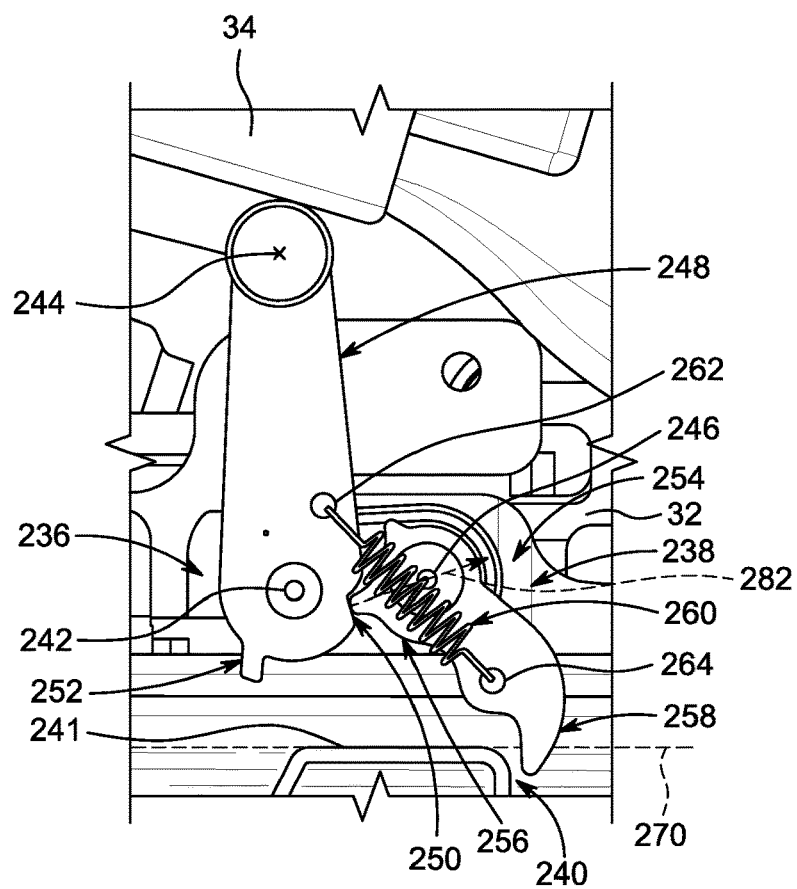
FIG. 21 is an enlarged portion of FIG. 17 showing the vehicle seat arranged in the tilted configuration and the second lever of the tilt-limiting unit arranged to extend below the upper limit of the stop so that the second lever engages the stop when the vehicle seat is moved from the slid-forward configuration toward the slid-back configuration.

The second lever 238 cooperates with the first lever 236 to block the vehicle seat 14 from pivoting downwardly to the horizontal-use configuration and cooperates with the stationary stop 240 to disengage the tilt-limiting unit 222. The second lever 238 includes a second lever body 254, a second retainer 256, and a lever arm 258 as shown in FIG. 15. The lever body 254 houses a bearing and/or bushing 251 that provides the third pivot axis 246 and allows the second lever 238 to pivot relative to the stationary frame 32 when the vehicle seat 14 changes between the horizontal-use configuration and the tilted configuration. The retainer 256 is configured to interact with the first retainer 250 when the vehicle seat 14 is in the tilted configuration to block the vehicle seat 14 from tilting downwardly back to the horizontal-use configuration as shown in FIGS. 17 and 21. In illustrative embodiments, the second retainer 256 forms a protrusion that complements the engagement surface 253 of the first retainer 250, however, the retainer 256 may be shaped differently in some embodiments. The lever arm 258 cooperates with the stationary stop 240 to disengage the first retainer 250 and the second retainer 256 so that the vehicle seat 14 can be tilted downwardly back to the horizontal-use configuration.

The first lever 236 and the second lever 238 are also coupled to one another by a biasing spring 260 as shown in FIG. 15. The biasing spring 260 is coupled to the lever body 248 of the first lever 236 using a first aperture 262 and is coupled to the lever body 254 of the second lever 238 using a second aperture 264. The biasing spring 260 extends along a line between the first aperture 262 and the second aperture 264 that is arranged to lie above the first pivot axis 242 and below the third pivot axis 246. The biasing spring 260 is arranged relative to the first pivot axis 242 and the third pivot axis 246 to urge the second lever 238 to rotate about the third pivot axis 246 in a direction that moves the second retainer 56 toward the rotation-blocking surface 257 of the first retainer 250. The biasing spring 260 causes the second lever 238 to rotate in a same direction to a direction of rotation of the first lever 236 when the vehicle seat 14 is changing from the horizontal-use configuration to the tilted configuration. The lever arm 258 is located on an opposite end of the second lever 238 from the retainer 256 relative to the third pivot axis 246 such that the lever arm 258 and the retainer 256 move in opposite downward and upward directions from one another as the second lever 238 pivots about the third pivot axis 246 when the vehicle seat 14 changes from the horizontal-use configuration to the tilted configuration.

In illustrative embodiments, the biasing spring 260 is a helical tension spring that applies a tension force between the first and second apertures 262, 264 to pull the second lever 238 to rotate in a clockwise direction about the third pivot axis 246 when viewed in the direction shown in FIGS. 14-23. In some embodiments, the second lever 238 may be biased to rotate about the third pivot axis 246 by another type of spring such as a torsion spring, a helical compression spring, a leaf spring, a plate spring, or any other suitable type of spring.

Figure 16:
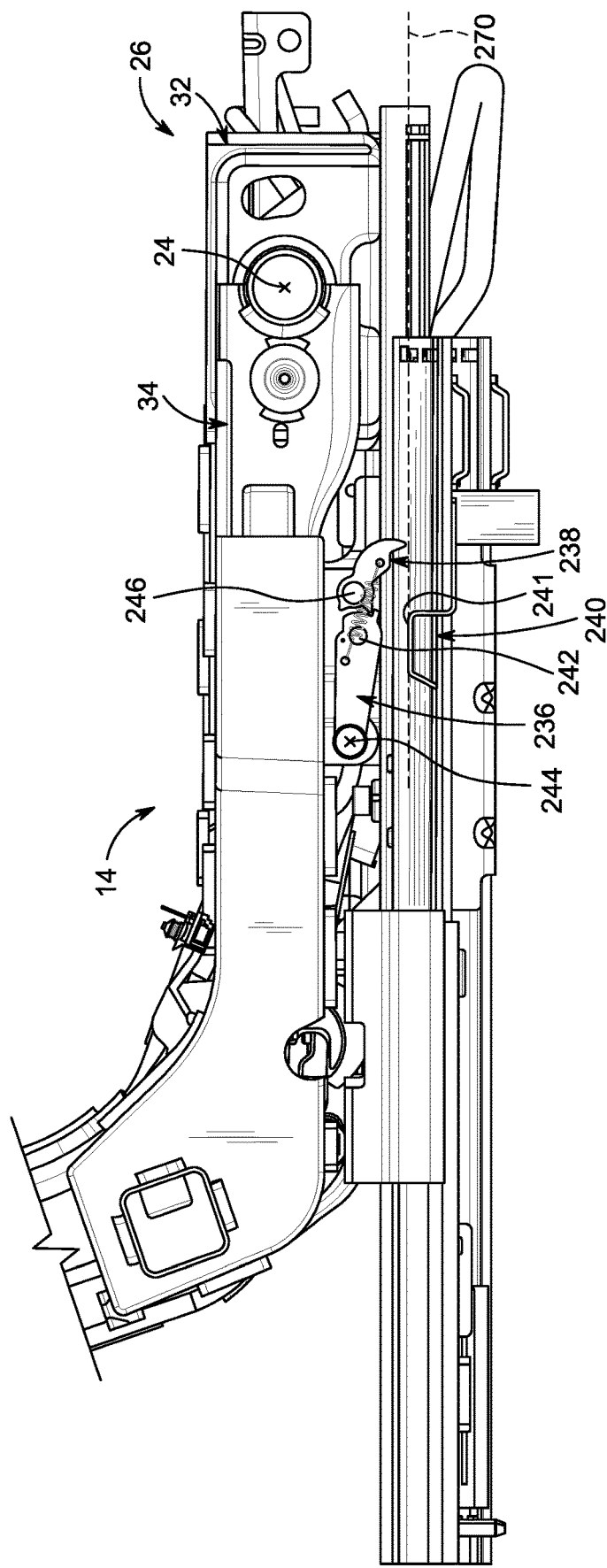
FIG. 16 is a side view of the occupant support with portions removed showing the vehicle seat arranged in the forward-seating configuration and in the horizontal-use configuration and showing the first lever positioned above an upper limit of the stationary stop so that the vehicle seat can move from the slid-back configuration to the slid-forward configuration.
Figure 18:
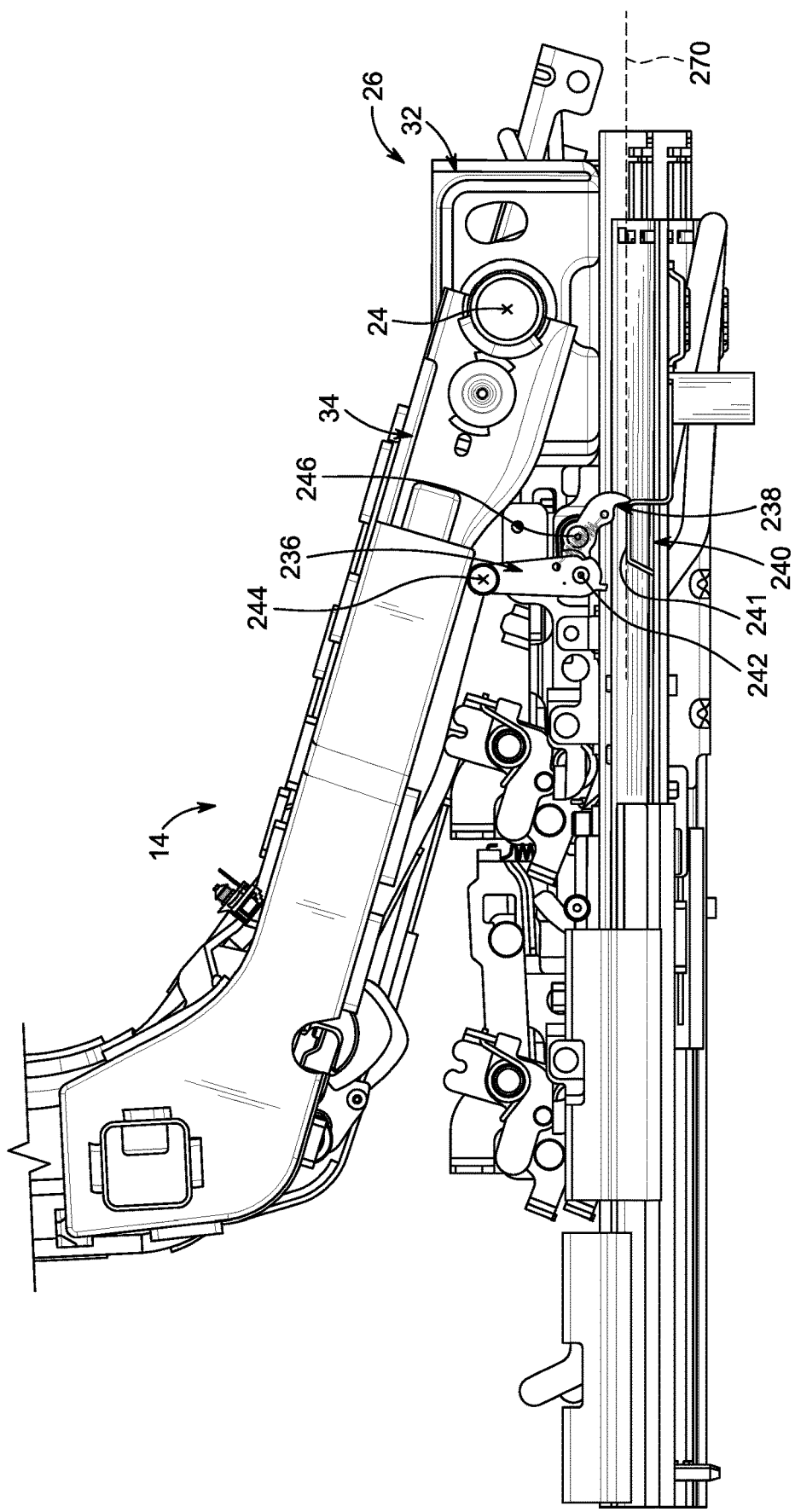
FIG. 18 is a side view of the occupant support with portions removed showing the vehicle seat arranged in the tilted configuration and moved from the slid-forward configuration toward the slid-back configuration and showing the second lever contacting the stop to disengage the tilt-limiting unit.
Figure 19:
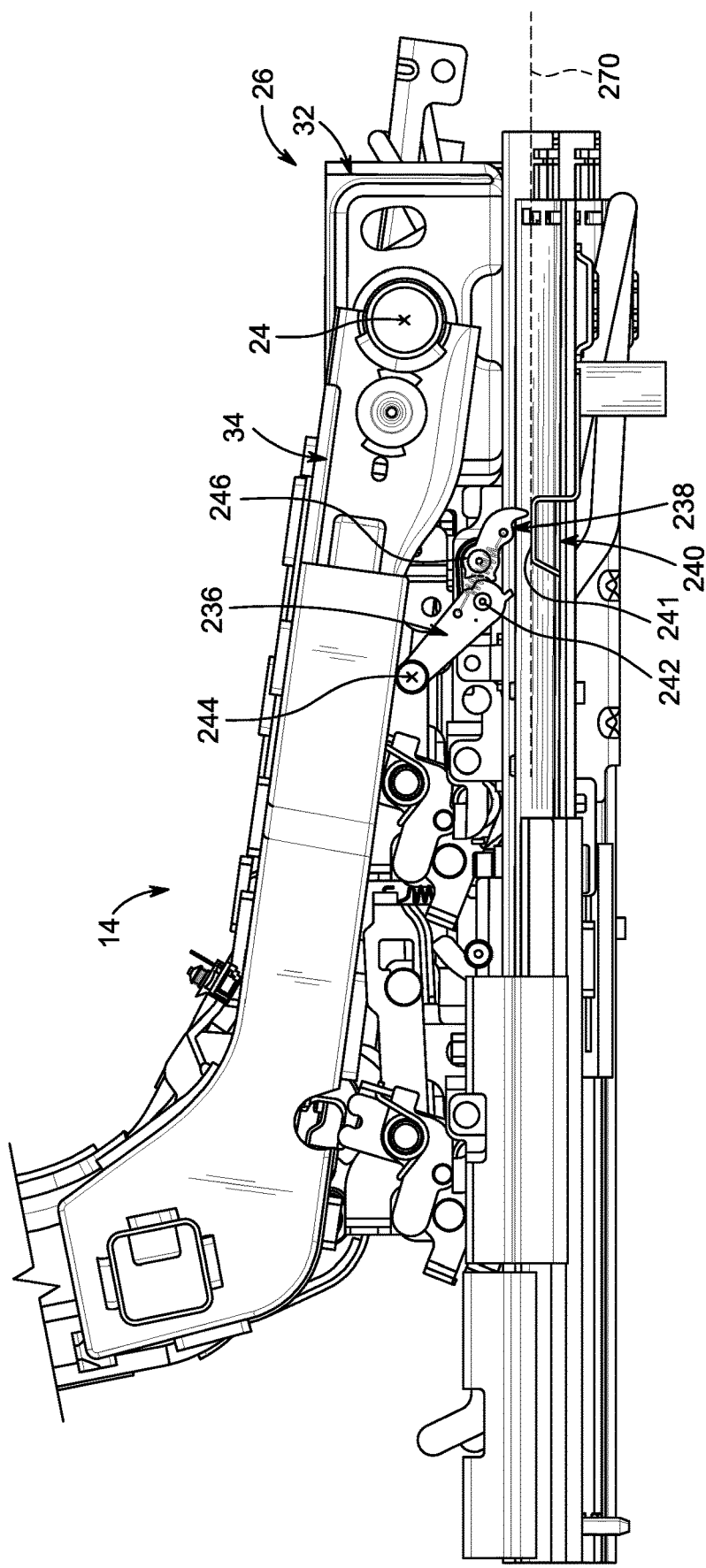
FIG. 19 is a side view of the occupant support with portions removed showing the vehicle seat moved further toward the slid-back configuration and showing the second lever freed from the first lever so that the vehicle seat can return to the horizontal-use configuration.
Figure 20:
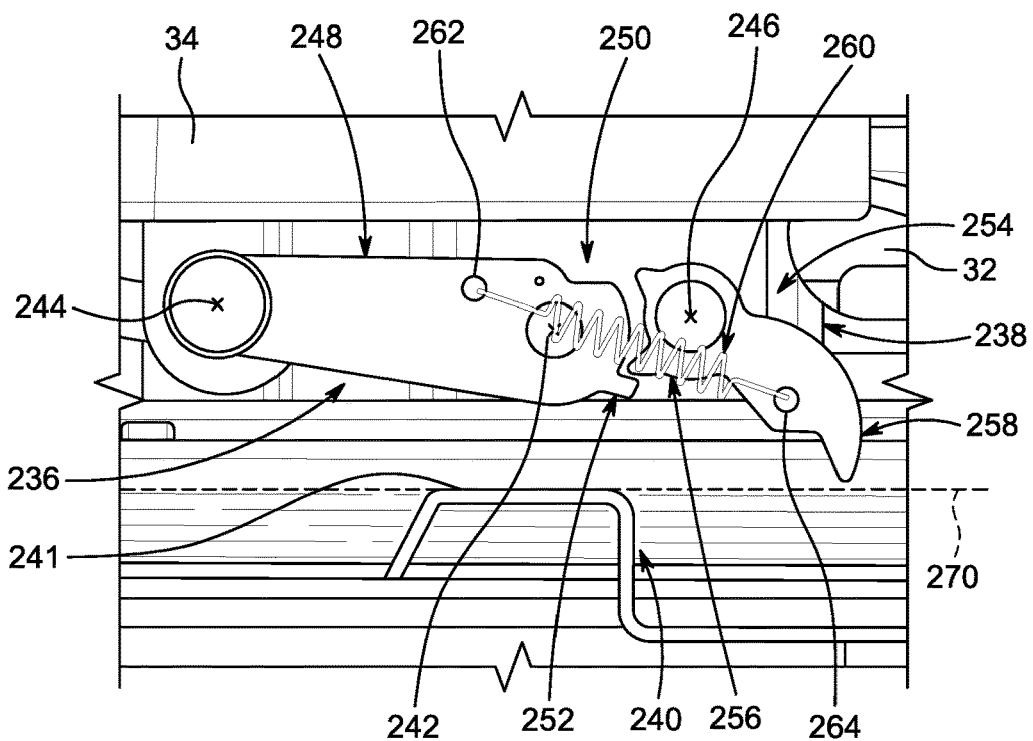
FIG. 20 is an enlarged portion of FIG. 16 showing the vehicle seat in the horizontal-use configuration and the second lever of the tilt-limiting unit positioned above the upper limit of the stop so that the vehicle seat is free to move between the slid-back configuration and the slid-forward configuration.

The stationary stop 240 is a rigid component having an upper surface 241 that is arranged to extend along a horizontal limit plane 270 as shown in FIGS. 15-18. The upper surface 241 provides an upper limit of the stop 240 relative to the second lever 238. The second lever 238 is located entirely above the horizontal limit plane 270 when the vehicle seat 14 is in the horizontal-use configuration as shown in FIGS. 15 and 16. The second lever 238 is biased such that a portion of the second lever 238 extends below the horizontal limit plane 270 when the vehicle seat 14 is in the tilted configuration as shown in FIGS. 17 and 18. The second lever 238 is configured to engage the stationary stop 240 as the vehicle seat 14 is moved from the slid-forward configuration toward the slid-back configuration to allow the vehicle seat 14 to return to the horizontal-use configuration as shown in FIGS. 19 and 20. The tilt-limiting unit 222 and portions of the vehicle seat 14 and foundation frame 12 are enlarged in FIGS. 20-23 to further illustrate the movements of each component relative to one another as the vehicle seat 14 changes between the horizontal-use configuration and the tilted configuration.

The vehicle seat 14 is configured to move from the slid-back configuration, as shown in FIGS. 14 and 15, toward the slid-forward configuration, as shown in FIG. 16. The lever arm 258 of the second lever 238 is positioned aft of the stationary stop 240 when the vehicle seat 14 is in the slid-back configuration as shown in FIG. 14. The lever arm 258 is positioned forward of the stationary stop 240 when the vehicle seat 14 is in the forward-seating configuration and the slid-forward configuration as shown in FIGS. 16 and 17. In the forward-seating configuration, the actuator 18 may be engaged by a user to release the seat lock 20 so that the pivotable frame 34 may pivot about the frame pivot axis 24 from the horizontal-use configuration, as shown in FIG. 16, to the tilted configuration, as shown in FIG. 17. In some embodiments, the seat lock 20 is blocked from being released until the vehicle seat 14 is in the forward-seating configuration to ensure that the lever arm 254 is positioned forward of the stationary stop 240 before the vehicle seat 14 is moved to the tilted configuration.

Figure 22:
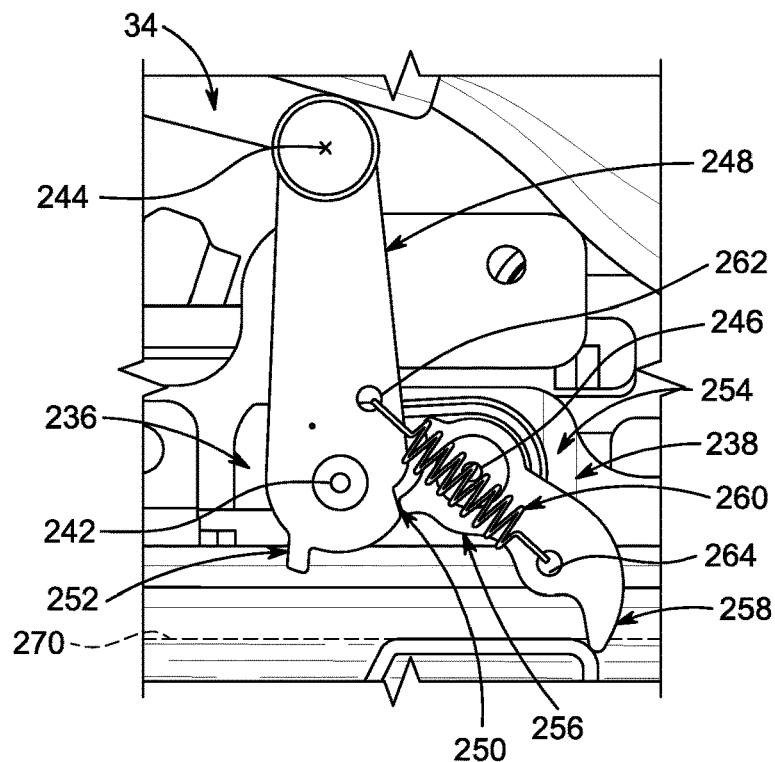
FIG. 22 is an enlarged portion of FIG. 19 showing the second lever contacting the stop to pivot the second lever out of engagement with the first lever so that the vehicle seat is free to move from the tilted configuration to the horizontal-use configuration.

The second lever 238 is configured to move relative to the first lever 236 between a freed position and a locked position when the vehicle seat 14 changes from the horizontal-use configuration to the tilted configuration as shown in FIGS. 16, 17, 21, and 22. In the freed position, the retainer 256 of the second lever 238 is biased into contact with rotation blocker 252 of the first lever 36 by the spring 260 and rotation blocker 252 blocks second lever 238 from rotating so that lever arm 258 remains above the horizontal reference plane 270. When the vehicle seat 14 is moved to the tilted configuration, the retainer 250 of the first lever 236 is rotated downwardly until retainer 256 of second lever 238 slides over engagement surface 253 of retainer 250 of first lever 236 as shown in FIGS. 17, 18, and 22. The indentation providing retainer 250 provides space for retainer 256 to extend into such that spring 260 biases retainer 256 of second lever 238 to move upwardly to engage with engagement surface 253 and rotation-blocking surface 255 of retainer 250 in the locked position. At the same time, rotation of the second lever 238 by spring 260 causes lever arm 258 to move downwardly and to extend below horizontal reference plane 270.

In the locked position, the retainers 250, 256 cooperate to block the pivotable frame 34 from tilting downwardly toward the foundation frame 12 due to their orientation relative to one another. The retainer 250 of the first lever 236 and the retainer 256 of the second lever 238 are oriented relative to one another so that a force vector 282 extends along a line through third pivot axis 246 and each retainer 250, 256 toward frame pivot axis 24 as suggested in FIG. 21. The engagement surface 253 is normal to force vector 282 and presses against retainer 256 to block pivotable frame 34 from returning to the horizontal-use configuration. Force vector 282 is formed as a result of a compressive load being applied by the engagement surface 253 of retainer 250 of the first lever 236 on the retainer 256 of the second lever 238. This blocks the first lever 236 from rotating in a counter-clockwise direction about first pivot axis 242 until the retainer 256 of the second lever 238 is freed from the retainer 250 of the first lever 236. In some embodiments, the force vector 282 extends through frame pivot axis 24.

Figure 23:
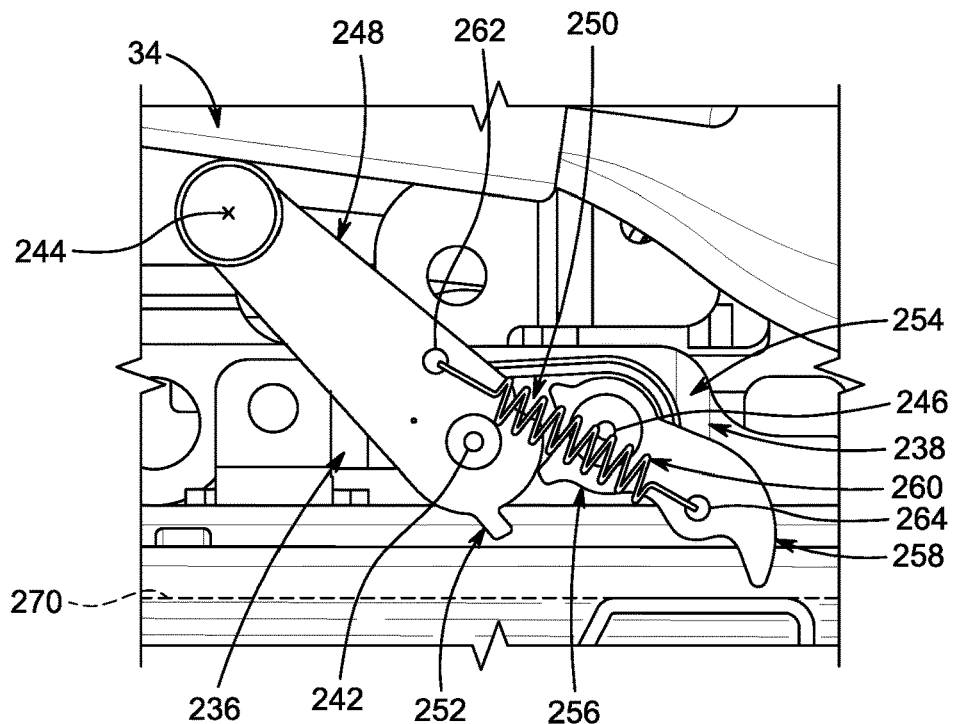
FIG. 23 is an enlarged portion of FIG. 20 showing the vehicle seat returning to the horizontal-use configuration and the second lever returned to a position above the upper limit of the stop.

To change the vehicle seat 14 from the tilted configuration to the horizontal use configuration, the vehicle seat 14 is moved from the slid-forward configuration toward the slid-back configuration as shown in FIGS. 17-19 and 21-23. The lever arm 258 is configured to engage the stationary stop 240 as the vehicle seat is moved from the slid-forward configuration toward the slid-back configuration because it is biased to extend below horizontal reference plane 270 as shown in FIGS. 18 and 21. The stationary stop 240 causes the second lever 238 to rotate from the locked position to the freed position where the retainer 256 of the second lever 238 is disengaged from retainer 250 of the first lever as shown in FIGS. 19, 22, and 23. Once retainer 256 is freed from engagement surface 253, pivotable frame 34 is free to return to the horizontal-use configuration.

In illustrative embodiments, tilt-limiting unit 22 is located on an outboard side of vehicle seat 14 and tilt-limiting unit 222 is located on an inboard side of vehicle seat 14. Each tilt-limiting unit 22, 222 is structured differently from one another to be coupled to each respective outboard and inboard sides of vehicle seat 14 which may have differently shaped components such as functionality or safety considerations of vehicle seat 14. Accordingly, the present disclosure provides a method of providing a tilt-limiting unit 22, 222 to both sides of a vehicle seat 14 while structuring each tilt-limiting unit 22, 222 to match the structure of the inboard and outboard sides of the vehicle seat 14. First lever 236 and second lever 238 may be referred to as a third lever and a fourth lever, respectively, since tilt-limiting units 22, 222 are included in the same occupant support 10. In other embodiments, a vehicle seat may include either tilt-limiting unit 22 or tilt-limiting unit 222 on both the inboard and outboard sides of the vehicle seat.

The following numbered clauses include embodiments that are contemplated and are non-limiting:

Clause 1. An occupant support comprises a foundation frame adapted to be coupled to a floor of a vehicle.

Clause 2. The occupant support of clause 1, any other suitable clause, or any suitable combination of clauses, further comprising a vehicle seat mounted on the foundation frame for sliding movement along foundation frame between a slid-back configuration and a slid-forward configuration and configured to move from a horizontal-use configuration to a tilted configuration when in the slid-forward configuration, the vehicle seat including a stationary frame mounted to the foundation frame and a pivotable frame coupled to the stationary frame and configured to pivot about a frame pivot axis as the occupant changes between the horizontal-use configuration and the tilted configuration.

Clause 3. The occupant support of clause 2, any other suitable clause, or any suitable combination of clauses, further comprising a pivot-control system including an actuator, a seat lock coupled to the actuator and configured to block the vehicle seat from moving from the horizontal-use configuration to the tilted configuration until the vehicle seat is moved to the slid-forward configuration and the actuator is activated to release the seat lock, and a tilt-limiting unit configured to retain the vehicle seat in the tilted configuration until the vehicle seat is moved from the slid-forward configuration toward the slid-back configuration.

Clause 4. The occupant support of clause 3, any other suitable clause, or any suitable combination of clauses, wherein the tilt-limiting unit includes a first lever that extends between and interconnects the stationary frame and the pivotable frame, a second lever coupled to the stationary frame and arranged to lie in a locked position with the first lever in the tilted configuration to block the vehicle seat from moving to the horizontal-use configuration, and a stop coupled to the foundation frame and arranged to engage the second lever when the vehicle seat is in the tilted configuration and is moved from the slid-forward configuration toward the slid-back configuration so that the first lever and the second lever are moved to a freed position so that the vehicle seat may move from the tilted configuration to the horizontal-use configuration.

Clause 5. The occupant support of clause 4, any other suitable clause, or any suitable combination of clauses, wherein the first lever is mounted to the stationary frame for pivotable movement relative to the stationary frame about a first pivot axis and the second lever is mounted to the stationary frame for pivotable movement about a second pivot axis spaced apart from the first pivot axis.

Clause 6. The occupant support of clause 5, any other suitable clause, or any suitable combination of clauses, wherein the first lever pivots in a first direction as the vehicle seat moves from the horizontal-use configuration to the tilted configuration and the second lever pivots in an opposite second direction as the vehicle seat moves from the horizontal-use configuration to the tilted configuration.

Clause 7. The occupant support of clause 6, any other suitable clause, or any suitable combination of clauses, wherein the tilt-limiting unit further includes a biasing spring that interconnects the first lever and the second lever and is arranged to lie above the first pivot axis and the second pivot axis when the vehicle seat is in the horizontal-use configuration and the tilted configuration.

Clause 8. The occupant support of clause 7, any other suitable clause, or any suitable combination of clauses, wherein the biasing spring is configured to urge the second lever to rotate in the second direction and the first second lever applies a tensile load on the second lever.

Clause 9. The occupant support of clause 8, any other suitable clause, or any suitable combination of clauses, wherein the second lever includes a second lever and a lever arm that is arranged to lie above an upper limit surface of the stop when the vehicle seat is in the horizontal-use configuration and that is biased by the biasing spring to extend downwardly below the upper limit surface of the stop when the vehicle seat is in the tilted configuration.

Clause 10. The occupant support of clause 9, any other suitable clause, or any suitable combination of clauses, wherein the lever arm is configured to contact the stop when the vehicle seat is moved from the slid-forward configuration toward the slid-back configuration to pivot the second lever in the first direction to change the second lever from the locked position to the freed position.

Clause 11. The occupant support of clause 5, any other suitable clause, or any suitable combination of clauses, wherein the first lever includes a first retainer and the second lever includes a second retainer that is spaced apart from the first retainer when the vehicle seat in in the horizontal-use configuration and is configured to interlock with the first retainer when the vehicle seat is in the tilted configuration.

Clause 12. The occupant support of clause 11, any other suitable clause, or any suitable combination of clauses, wherein the tilt-limiting unit further includes a biasing spring that interconnects the first lever and the second lever to urge the second lever to rotate in the first direction when the vehicle seat is in the horizontal-use configuration and the tilted configuration.

Clause 13. The occupant support of clause 11, any other suitable clause, or any suitable combination of clauses, wherein the biasing spring extends along a line that is above the first pivot axis and below the second pivot axis when the vehicle seat is in the tilted configuration and the first second lever applies a compressive load on the second lever.

Clause 14. The occupant support of clause 4, any other suitable clause, or any suitable combination of clauses, wherein the tilt-limiting unit is a first tilt-limiting unit and is coupled to a first lateral side of the vehicle seat and the occupant support further comprises a second tilt-limiting unit coupled to a second lateral side of the vehicle seat opposite the first lateral side, wherein the first lever interconnects the stationary frame and the pivotable frame and the second lever is coupled only to the stationary frame and is located aft of the first lever, and wherein the second tilt-limiting unit includes a third lever that interconnects the stationary frame and the pivotable frame and a fourth lever is coupled only to the stationary frame and is located forward of the third lever.

Clause 15. An occupant support comprises a foundation frame adapted to be coupled to a floor of a vehicle.

Clause 16. The occupant support of clause 15, any other suitable clause, or any suitable combination of clauses, further comprising a vehicle seat mounted on the foundation frame for sliding movement along foundation frame between a slid-back configuration and a slid-forward configuration and configured to move from a horizontal-use configuration to a tilted configuration.

Clause 17. The occupant support of clause 16, any other suitable clause, or any suitable combination of clauses, further comprising a tilt-limiting unit configured to retain the vehicle seat in the tilted configuration.

Clause 18. The occupant support of clause 17, any other suitable clause, or any suitable combination of clauses, wherein the tilt-limiting unit includes first lever, a second lever arranged to lie in a locked position with the first lever in the tilted configuration to block the vehicle seat from moving to the horizontal-use configuration, and a stop coupled to the foundation frame and arranged to engage the second lever when the vehicle seat is in the tilted configuration and is moved from the slid-forward configuration toward the slid-back configuration so that the first lever and the second lever are moved to a freed position so that the vehicle seat may move from the tilted configuration to the horizontal-use configuration.

Clause 19. The occupant support of clause 18, any other suitable clause, or any suitable combination of clauses, wherein the first lever is mounted to the stationary frame for pivotable movement relative to the stationary frame about a first pivot axis and the second lever is mounted to the stationary frame for pivotable movement about a second pivot axis spaced apart from the first pivot axis.

Clause 20. The occupant support of clause 19, any other suitable clause, or any suitable combination of clauses, wherein the first lever pivots in a first direction as the vehicle seat moves from the horizontal-use configuration to the tilted configuration and the second lever pivots in an opposite second direction as the vehicle seat moves from the horizontal-use configuration to the tilted configuration.

Clause 21. The occupant support of clause 20, any other suitable clause, or any suitable combination of clauses, wherein the tilt-limiting unit further includes a biasing spring that interconnects the first lever and the second lever and is arranged to lie above the first pivot axis and the second pivot axis when the vehicle seat is in the horizontal-use configuration and the tilted configuration.

Clause 22. The occupant support of clause 21, any other suitable clause, or any suitable combination of clauses, wherein the biasing spring is configured to urge the second lever to rotate in the second direction and the first second lever applies a tensile load on the second lever when the vehicle seat is in the tilted configuration.

Clause 23. The occupant support of clause 22, any other suitable clause, or any suitable combination of clauses, wherein the second lever includes a lever body and a lever arm that is arranged to lie above a upper limit of the stop when the vehicle seat is in the horizontal-use configuration and that is biased by the biasing spring to extend downwardly below the upper limit surface of the stop when the vehicle seat is in the tilted configuration.

Clause 24. The occupant support of clause 23, any other suitable clause, or any suitable combination of clauses, wherein the lever arm is configured to contact the stop when the vehicle seat is moved from the slid-forward configuration toward the slid-back configuration to pivot the second lever in the first direction to change the second lever from the locked position to the freed position.

Clause 25. The occupant support of clause 18, any other suitable clause, or any suitable combination of clauses, wherein the tilt-limiting unit further includes a biasing spring that interconnects the first lever and the second lever to urge the second lever to rotate in a first direction when the vehicle seat is in the horizontal-use configuration and the tilted configuration.

Clause 26. The occupant support of clause 25, any other suitable clause, or any suitable combination of clauses, wherein the biasing spring extends along a line that is above the first pivot axis and below the second pivot axis when the vehicle seat is in the tilted configuration and the first second lever applies a compressive load on the second lever.

The invention claimed is:

1. An occupant support comprising
a foundation frame adapted to be coupled to a floor of a vehicle,
a vehicle seat mounted on the foundation frame for sliding movement along the foundation frame between a slid-back configuration and a slid-forward configuration and configured to move from a horizontal-use configuration to a tilted configuration when in the slid-forward configuration, the vehicle seat including a stationary frame mounted to the foundation frame and a pivotable frame coupled to the stationary frame and configured to pivot about a frame pivot axis as the occupant changes between the horizontal-use configuration and the tilted configuration, and
a pivot-control system including an actuator, a seat lock coupled to the actuator and configured to block the vehicle seat from moving from the horizontal-use configuration to the tilted configuration until the vehicle seat is moved to the slid-forward configuration and the actuator is activated to release the seat lock, and a tilt-limiting unit configured to retain the vehicle seat in the tilted configuration until the vehicle seat is moved from the slid-forward configuration toward the slid-back configuration, wherein the tilt-limiting unit includes a first lever that extends between and interconnects the stationary frame and the pivotable frame, a second lever coupled to the stationary frame and arranged to lie in a locked position with the first lever in the tilted configuration to block the vehicle seat from moving to the horizontal-use configuration, and a stop coupled to the foundation frame and arranged to engage the second lever when the vehicle seat is in the tilted configuration and is moved from the slid-forward configuration toward the slid-back configuration so that the first lever and the second lever are moved to a freed position so that the vehicle seat may move from the tilted configuration to the horizontal-use configuration, and wherein the first lever is mounted to the stationary frame for pivotable movement relative to the stationary frame about a first pivot axis and the second lever is mounted to the stationary frame for pivotable movement about a second pivot axis spaced apart from the first pivot axis.

2. The occupant support of claim 1, wherein the first lever pivots in a first direction as the vehicle seat moves from the horizontal-use configuration to the tilted configuration and the second lever pivots in an opposite second direction as the vehicle seat moves from the horizontal-use configuration to the tilted configuration.

3. The occupant support of claim 2, wherein the tilt-limiting unit further includes a biasing spring that interconnects the first lever and the second lever and is arranged to lie above the first pivot axis and the second pivot axis when the vehicle seat is in the horizontal-use configuration and the tilted configuration.

4. The occupant support of claim 3, wherein the biasing spring is configured to urge the second lever to rotate in the second direction and the first lever applies a tensile load on the second lever.

5. The occupant support of claim 4, wherein the second lever includes a lever arm that is arranged to lie above an upper limit surface of the stop when the vehicle seat is in the horizontal-use configuration and that is biased by the biasing spring to extend downwardly below the upper limit surface of the stop when the vehicle seat is in the tilted configuration.

6. The occupant support of claim 5, wherein the lever arm is configured to contact the stop when the vehicle seat is moved from the slid-forward configuration toward the slid-back configuration to pivot the second lever in the first direction to change the second lever from the locked position to the freed position.

7. The occupant support of claim 1, wherein the first lever includes a first retainer and the second lever includes a second retainer that is spaced apart from the first retainer when the vehicle seat in in the horizontal-use configuration and is configured to interlock with the first retainer when the vehicle seat is in the tilted configuration.

8. The occupant support of claim 7, wherein the tilt-limiting unit further includes a biasing spring that interconnects the first lever and the second lever to urge the second lever to rotate in the first direction when the vehicle seat is in the horizontal-use configuration and the tilted configuration.

9. The occupant support of claim 7, wherein the biasing spring extends along a line that is above the first pivot axis and below the second pivot axis when the vehicle seat is in the tilted configuration and the first lever applies a compressive load on the second lever.

10. The occupant support of claim 1, wherein the tilt-limiting unit is a first tilt-limiting unit and is coupled to a first lateral side of the vehicle seat and the occupant support further comprises a second tilt-limiting unit coupled to a second lateral side of the vehicle seat opposite the first lateral side, wherein the first lever interconnects the stationary frame and the pivotable frame and the second lever is coupled only to the stationary frame and is located aft of the first lever, and wherein the second tilt-limiting unit includes a third lever that interconnects the stationary frame and the pivotable frame and a fourth lever is coupled only to the stationary frame and is located forward of the third lever.

11. An occupant support comprising
a foundation frame adapted to be coupled to a floor of a vehicle,
a vehicle seat mounted on the foundation frame for sliding movement along the foundation frame between a slid-back configuration and a slid-forward configuration and configured to move from a horizontal-use configuration to a tilted configuration, and
a tilt-limiting unit configured to retain the vehicle seat in the tilted configuration,
wherein the tilt-limiting unit includes a first lever, a second lever arranged to lie in a locked position with the first lever in the tilted configuration to block the vehicle seat from moving to the horizontal-use configuration, and a stop coupled to the foundation frame and arranged to engage the second lever when the vehicle seat is in the tilted configuration and is moved from the slid-forward configuration toward the slid-back configuration so that the first lever and the second lever are moved to a freed position so that the vehicle seat may move from the tilted configuration to the horizontal-use configuration, wherein the first lever is mounted to the stationary frame for pivotable movement relative to the stationary frame about a first pivot axis and the second lever is mounted to the stationary frame for pivotable movement about a second pivot axis spaced apart from the first pivot axis.

12. The occupant support of claim 11, wherein the first lever pivots in a first direction as the vehicle seat moves from the horizontal-use configuration to the tilted configuration and the second lever pivots in an opposite second direction as the vehicle seat moves from the horizontal-use configuration to the tilted configuration.

13. The occupant support of claim 12, wherein the tilt-limiting unit further includes a biasing spring that interconnects the first lever and the second lever and is arranged to lie above the first pivot axis and the second pivot axis when the vehicle seat is in the horizontal-use configuration and the tilted configuration.

14. The occupant support of claim 13, wherein the biasing spring is configured to urge the second lever to rotate in the second direction and the first second lever applies a tensile load on the second lever when the vehicle seat is in the tilted configuration.

15. The occupant support of claim 14, wherein the second lever includes a lever body and a lever arm that is arranged to lie above a upper limit of the stop when the vehicle seat is in the horizontal-use configuration and that is biased by the biasing spring to extend downwardly below the upper limit surface of the stop when the vehicle seat is in the tilted configuration.

16. The occupant support of claim 15, wherein the lever arm is configured to contact the stop when the vehicle seat is moved from the slid-forward configuration toward the slid-back configuration to pivot the second lever in the first direction to change the second lever from the locked position to the freed position.

17. The occupant support of claim 11, wherein the tilt-limiting unit further includes a biasing spring that interconnects the first lever and the second lever to urge the second lever to rotate in a first direction when the vehicle seat is in the horizontal-use configuration and the tilted configuration.

18. The occupant support of claim 17, wherein the biasing spring extends along a line that is above the first pivot axis and below the second pivot axis when the vehicle seat is in the tilted configuration and the first second lever applies a compressive load on the second lever.

* * * * *